US010122742B1

(12) United States Patent
Oprea et al.

(10) Patent No.: US 10,122,742 B1
(45) Date of Patent: Nov. 6, 2018

(54) CLASSIFYING SOFTWARE MODULES BASED ON COMPARISONS USING A NEIGHBORHOOD DISTANCE METRIC

(71) Applicant: EMC Corporation, Hopkinton, MA (US)

(72) Inventors: Alina M. Oprea, Arlington, MA (US); Zhou Li, Malden, MA (US); Ahmet Buyukkayhan, Malden, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 369 days.

(21) Appl. No.: 15/191,027

(22) Filed: Jun. 23, 2016

(51) Int. Cl.
*H04L 29/06* (2006.01)
*H04L 29/08* (2006.01)
*G06F 17/30* (2006.01)

(52) U.S. Cl.
CPC .... *H04L 63/1425* (2013.01); *G06F 17/30598* (2013.01); *H04L 67/10* (2013.01)

(58) Field of Classification Search
None
See application file for complete search history.

(56) References Cited

U.S. PATENT DOCUMENTS

| 7,392,544 | B1 | | 6/2008 | Pavlyushchik | |
| 8,516,575 | B2 | * | 8/2013 | Burnside | H04L 63/1425 715/733 |
| 8,769,676 | B1 | * | 7/2014 | Kashyap | G06F 21/554 726/22 |
| 9,910,986 | B1 | * | 3/2018 | Saxe | G06F 21/563 |
| 9,998,484 | B1 | * | 6/2018 | Buyukkayhan | H04L 63/1416 |
| 2010/0153181 | A1 | * | 6/2010 | Altunbasak | G06Q 10/0639 705/7.38 |
| 2010/0161652 | A1 | * | 6/2010 | Bellare | G06G 17/30265 707/769 |

(Continued)

OTHER PUBLICATIONS

Smith et al., "Penalty Functions", University of Pittsburgh, 1996, Oxford University Press and Institute of Physics Publishing, p. 1-11.*

(Continued)

*Primary Examiner* — Jeffery L Williams
(74) *Attorney, Agent, or Firm* — Ryan, Mason & Lewis, LLP

(57) ABSTRACT

A method comprises obtaining at least a first software module not classified as benign or potentially malicious, extracting a set of features associated with the first software module, the set of features comprising static features, behavior features and context features, identifying a first cluster comprising one or more known software modules previously classified as benign, computing distance metrics between the extracted feature set of the first software module and feature sets of respective ones of the known software modules in the first cluster, classifying the first software module as one of benign and potentially malicious based on a comparison between the computed distance metrics and a neighborhood distance metric based on distances between feature sets of the known software modules in the first cluster, and modifying access by a given client device to the first software module responsive to classifying the first software module as potentially malicious.

19 Claims, 16 Drawing Sheets

(56) References Cited

U.S. PATENT DOCUMENTS

| | | | | |
|---|---|---|---|---|
| 2011/0271146 | A1* | 11/2011 | Mork | G06F 17/30442 714/37 |
| 2015/0215331 | A1* | 7/2015 | Mhatre | H04L 63/1416 726/23 |
| 2015/0254566 | A1* | 9/2015 | Chandramouli | G06F 17/27 706/11 |
| 2017/0300911 | A1* | 10/2017 | Alnajem | G06Q 20/4014 |
| 2017/0318035 | A1* | 11/2017 | Baughman | H04L 63/1416 |
| 2018/0212987 | A1* | 7/2018 | Tamir | G06F 21/568 |

OTHER PUBLICATIONS

Jang, et al., "Mal-netminer: malware classification based on social network analysis of call graph". In Proceedings of the 23rd International Conference on World Wide Web (WWW '14 Companion). ACM, 2014, New York, NY, USA, 731-734.*

Alshahwan et al., "Detecting Malware with information Complexity", ACM, 2015, p. 1-12.*

Dredze et al., "Confidence-weighted linear classification", In Proceedings of the 25th international conference on Machine learning (ICML '08). ACM, 2008, New York, NY, USA, 264-271.*

A.P. Namanya et al., "Evaluation of Automated Static Analysis Tools for Malware Detection in Portable Executable Files," 31st UK Performance Engineering Workshop (UKPEW), University of Leeds, Sep. 2015, pp. 81-95.

C. Rossow et al., "Sandnet: Network Traffic Analysis of Malicious Software," First Workshop on Building Analysis Datasets and Gathering Experience Returns for Security (BADGERS), Apr. 2011, pp. 78-88, Salzburg, Austria.

I. Burguera et al., "Crowdroid: Behavior-Based Malware Detection System for Android," 1st ACM Workshop on Security and Privacy in Smartphones and Mobile Devices (SPSM), Oct. 2011, pp. 15-26.

Verizon, 2015 Data Breach Investigations Report (DBIR), available at: http://www.verizonenterprise.com/DBIR/2015/, 2015, 70 pages.

J. Tang et al., "Feature Selection for Classification: A Review," Data Classification: Algorithms and Applications, Jul. 2014, 37 pages.

M. Bailey et al., "Automated Classification and Analysis of Internet Malware," 10th International Conference on Recent Advances in Intrusion Detection (RAID), Sep. 2007, pp. 178-197.

U. Bayer et al., "Scalable, Behavior-Based Malware Clustering," 16th Annual Network and Distributed System Security Symposium (NDSS), Feb. 2009, pp. 8-11, vol. 9.

M. Dash et al., "Feature Selection for Clustering—A Filter Solution," IEEE International Conference on Data Mining (ICDM), 2002, 10 pages.

M. Ester et al., "A Density-Based Algorithm for Discovering Clusters in Large Spatial Databases with Noise," Second International Conference on Knowledge Discovery and Data Mining (KDD), Aug. 1996, pp. 226-231, vol. 96, No. 34.

X. He et al., "Laplacian Score for Feature Selection," Advances in Neural Information Processing Systems (NIPS), Dec. 2005, pp. 507-514, Vancouver, British Columbia, Canada.

X. Hu et al., "DUET: Integration of Dynamic and Static Analyses for Malware Clustering with Cluster Ensembles," 29th Annual Computer Security Applications Conference (ACSAC), 2013, pp. 79-88.

X. Hu et al., "MutantX-S: Scalable Malware Clustering Based on Static Features," USENIX Annual Technical Conference (USENIX ATC), 2013, pp. 187-198.

Mandiant, "APT1: Exposing One of China's Cyber Espionage Units," www.mandiang.com, 2013, 76 pages.

M. Neugschwandtner et al., "FORECAST—Skimming Off the Malware Cream," 27th Annual Computer Security Applications Conference (ACSAC), Dec. 2011, pp. 11-20.

Panda Security, "PandaLabs Annual Report 2014," http://press.pandasecurity.com, 2014, 37 pages.

R. Perdisci et al., "Behavioral Clustering of HTTP-Based Malware and Signature Generation Using Malicious Network Traces," 7th USENIX Symposium on Networked Systems Design and Implementation (NSDI), Apr. 2010, 14 pages.

K. Rieck et al., "Automatic Analysis of Malware Behavior Using Machine Learning, Technische Universitat Berlin, Forschungsberichte der Fakultat IV—Elektrotechnik and Informatik, 2009, 30 pages.

T. Hastie et al., "The Elements of Statistical Learning: Data Mining, Inference, and Prediction", Springer 2009.

U.S. Appl. No. 15/082,731, filed in the name of Ahmet Buyukkayhan et al. on Mar. 28, 2016 and entitled "Classifying Potentially Malicious and Benign Software Modules Through Similarity Analysis."

Svetlana Cherednichenko, "Outlier Detection in Clustering," University of Joensuu, Master's Thesis, Jan. 24, 2006, 57 pages.

A. Gorla et al., "Checking App Behavior Against App Descriptions," Proceedings of the International Conference on Software Engineering (ICSE), Jun. 2014, pp. 292-302.

S.D. Pachgade et al., "Outlier Detection Over Data Set Using Cluster-Based and Distance-Based Approach," International Journal of Advanced Research in Computer Science and Software Engineering (IJARCSSE), Jun. 2012, pp. 12-16, vol. 2, No. 6.

H.H. Feng et al., "Anomaly Detection Using Call Stack Information," Proceedings of the IEEE Symposium on Security and Privacy (SP), Jun. 2003, pp. 62-75.

D. Gao et al., "Gray-Box Extraction of Execution Graphs for Anomaly Detection," Proceedings of the 11th ACM Conference on Computer and Communications Security (CCS), Oct. 2004, pp. 318-329.

Z. Gu et al., "Leaps: Detecting Camouflaged Attacks with Statistical Learning Guided by Program Analysis," 45th Annual IEEE/IFIP International Conference on Dependable Systems and Networks (DSN), Jun. 2015, pp. 57-68, Rio de Janeiro, Brazil.

S.A. Hofmeyr et al., "Intrusion Detection Using Sequences of System Calls," Journal of Computer Security, Aug. 1998, pp. 151-180, vol. 6, No. 3.

A. Lanzi et al., "AccessMiner: Using System-Centric Models for Malware Protection," Proceedings of the 17th ACM Conference on Computer and Communications Security (CCS), Oct. 2010, pp. 399-412.

W. Lee et al., "Data Mining Approaches for Intrusion Detection," Proceedings of the 7th Conference on USENIX Security Symposium, Jan. 1998, 16 pages,vol. 7.

W. Lee et al., "Learning Patterns from Unix Process Execution Traces for Intrusion Detection," AAAI Workshop on AI Approaches to Fraud Detection and Risk Management, Jul. 1997, pp. 50-56.

McAfee Labs, "Diary of a "RAT" (Remote Access Tool)," https://kc.mcafee.com/resources/sites/MCAFEE/content/live/PRODUCT_DOCUMENTATION/23000/PD23258/en_US/Diary_of_a_RAT_datasheet.pdf, 2011, 2 pages.

McAfee Labs, "ZeroAccess Rootkit," https://kc.mcafee.com/resources/sites/MCAFEE/content/live/PRODUCT_DOCUMENTATION_23000_PD23412/en_US/McAfee%20Labs%20Threat%20Advisory-ZeroAccess.pdf, Aug. 29, 2013, 11 pages.

R. Sekar et al., "A Fast Automaton-Based Method for Detecting Anomalous Program Behaviors," Proceedings of the IEEE Symposium on Security and Privacy (SP), May 2001, pp. 144-155.

S. Shin et al., "EFFORT: A New Host-Network Cooperated Framework for Efficient and Effective Bot Malware Detection," Computer Networks: The International Journal of Computer and Telecommunications Networking, Sep. 2013, pp. 2628-2642, vol. 57, No. 13.

Symantec, "The Rebirth of Endpoint Security," http://www.darkreading.com/endpoint/the-rebirth-of-endpoint-security/d/d-id/1322775, Jun. 22, 2016, 13 pages.

T.-F. Yen et al., "Beehive: Large-Scale Log Analysis for Detecting Suspicious Activity in Enterprise Networks," Proceedings of the 29th Annual Computer Security Applications Conference (ACSAC), Dec. 2013, pp. 199-208.

Y. Zeng et al., "Detection of Botnets Using Combined Host- and Network-Level Information," IEEE/IFIP International Conference on Dependable Systems and Networks (DSN), Jun.-Jul. 2010, pp. 291-300.

* cited by examiner

| Status | #Total | #Description | #Company Name | #Signature |
|---|---|---|---|---|
| BL | 534 | 440 | 445 | 520 |
| WL | 117,128 | 19,881 | 13,070 | 2,430 |
| UL | 1,692,157 | 1,304,557 | 1,314,780 | 1,503,449 |

| Category | Sub-category | Feature | Description | Type |
|---|---|---|---|---|
| Static | Descriptive | Description | File description | String |
| | | Company name | Name of company | String |
| | | Imported DLLs | Name of all imported DLLs | Set |
| | | Section names | Name of all section names | Set |
| | Numerical | File size | Size of module | Integer |
| | | PE size | Size from PE header | Integer |
| | | PE timestamp | Time when PE file was created | Date |
| | | Entropy | Module code entropy | Real |
| | | DLL count | Number of imported DLLs | Integer |
| | Attributes | Icon present | Is icon present? | Binary |
| | | Version information present | Is version information present? | Binary |
| | | PE type | Type of PE (32 or 64 bit) | Binary |
| | | PE machine | Type of targeted CPU (Intel 386, AMD64 etc.) | Categorical |
| | | Packed | Is module packed? | Binary |
| | | .NET | Is it built with .NET? | Binary |
| | | Signature | Signature name | String |
| | | Signature valid | Is signature valid? | Binary |
| Behavior | File-system access | Written/Renamed executables | Avg. number of executables written/renamed | Real |
| | Process access | Created processes | Avg. number of created processes | Real |
| | | Opened processes | Avg. number of opened processes | Real |
| | Network connections | Set of domains | Set of domains connected to | Set |
| | | Set of IPs | Set of IPs connected to | Set |

FIG. 7

| Category | Sub-category | Feature | Description | Type |
|---|---|---|---|---|
| Context | Module path | Path level | Avg. number of levels in path | Real |
| | | Path_System | Is located in System folder? | Real |
| | | Path_Windows | Is located in Windows folder? | Real |
| | | Path_ProgramFiles | Is located in ProgramFiles folder? | Real |
| | | Path_ProgramData | Is located in ProgramData folder? | Real |
| | | Path_AppDataLocal | Is located in AppDataLocal folder? | Real |
| | | Path_AppDataRoaming | Is located in AppDataRoaming folder? | Real |
| | | Path_User | Is located in user-specific folder? | Real |
| | | Number executables | Avg. number of executables in same folder | Real |
| | | Number executables same company | Avg. number of executables with same company in same folder | Real |
| | | Number non-executables | Avg. number of non-executables in same folder | Real |
| | | Number sub-folders | Avg. number of sub-folders in same folder | Real |
| | | Machine count | Number of installations | Integer |
| | Destination path | Dest_SamePath | Is destination path same as the module path? | Real |
| | | Dest_DifferentPath | Is destination path different than the module path? | Real |

FIG. 7 cont.

| Category | Sub-category | Feature | Description | Type |
|---|---|---|---|---|
| Context (continued) | Destination Path (continued) | Dest_System | Is destination in System(syswow64/system32) folder? | Real |
| | | Dest_Windows | Is destination in Windows folder? | Real |
| | | Dest_ProgramFiles | Is destination in ProgramFiles folder? | Real |
| | | Dest_ProgramData | Is destination in ProgramData folder? | Real |
| | | Dest_AppDataLocal | Is destination in AppDataLocal folder? | Real |
| | | Dest_AppDataRoaming | Is destination in AppDataRoaming folder? | Real |
| | | Dest_User | Is destination in user-specific folder? | Real |
| | | Dest_Temp | Is destination in Temp folder? | Real |
| | Metadata | Administrator | Is owner administrator? | Real |
| | | Hidden attributes | Does file have hidden attributes? | Real |
| | | Days since creation | Avg. days since observed on hosts | Real |
| | Auto-start | Auto_Services | Does the module have auto-start for services? | Real |
| | | Auto_ServiceDLL | Does the module have auto-start for service DLL? | Real |
| | | Auto_Logon | Does the module have auto-start for logon? | Real |
| | | Auto_ScheduledTasks | Does the module have auto-start for scheduled tasks? | Real |

FIG. 7 cont.

| Rank | Category | Feature | Importance |
|---|---|---|---|
| 1 | Static | Signature | 2.7 |
| 2 | Static | Signature valid | 2.5 |
| 3 | Static | Imported DLLs | 2.4 |
| 4 | Static | Description | 1.8 |
| 5 | Static | Company name | 1.7 |
| 6 | Static | Section names | 1.4 |
| 7 | Static | PE Size | 1.2 |
| 8 | Context | Number executables | 1.1 |
| 9 | Context | Number executables same company | 1 |
| 10 | Context | Hidden attributes | 1 |
| 11 | Static | Version information present | 0.8 |
| 12 | Context | Auto_Logon | 0.8 |
| 13 | Context | Path level | 0.8 |
| 14 | Context | Days since creation | 0.8 |
| 15 | Static | PE timestamp | 0.7 |

FIG. 11

| Dataset | Filename | #BL | #Mal | #Susp | #UK | Anomalous features |
|---|---|---|---|---|---|---|
| DS-Outlier-Black | services.exe | 2 | 1 | 2 | 0 | Unsigned, path, DLLs |
| | svchost.exe | 4 | 0 | 0 | 0 | Unsigned, path, DLLs, size, description, company name, Auto_Logon, hidden attribute |
| | googleupdate.exe | 1 | 0 | 1 | 0 | Invalid signature, DLLs, newly created, similar to malicious by ssdeep |
| | dwm.exe | 4 | 0 | 1 | 0 | Unsigned, path, DLLs |
| | wmplayer.exe | 1 | 0 | 3 | 0 | Unsigned, description, DLLs, similar to malicious by ssdeep |
| DS-Outlier-Unknown | flashplayerupdateservice.exe | 0 | 0 | 0 | 3 | Invalid signature |
| | googleupdatesetup.exe | 0 | 0 | 3 | 0 | Unsigned, path, version info, similar to malicious by ssdeep |
| | installflashplayer.exe | 0 | 5 | 5 | 0 | 5 Confirmed by VirusTotal, similar to malicious by ssdeep |
| | intelcphecisvc.exe | 0 | 0 | 1 | 0 | Unsigned, size, entropy, similar to malicious by ssdeep |
| | mpcmdrun.exe | 0 | 0 | 1 | 0 | Unsigned, size, network connections, similar to malicious by ssdeep |
| | pwmewsvc.exe | 0 | 0 | 0 | 1 | Unsigned, no version info, size, compile time |
| | tphkload.exe | 0 | 0 | 2 | 0 | Invalid signature, size, compile time, creates remote thread |
| | udaterui.exe | 0 | 0 | 0 | 1 | Invalid signature |
| | vpnagent.exe | 0 | 0 | 0 | 1 | Invalid signature |
| | vstskmgr.exe | 0 | 0 | 0 | 1 | Invalid signature |

FIG. 13

The field relates generally to security, and more particularly to detection of security threats.

CLASSIFYING SOFTWARE MODULES BASED ON COMPARISONS USING A NEIGHBORHOOD DISTANCE METRIC

FIELD

The field relates generally to security, and more particularly to detection of security threats.

BACKGROUND

Various entities are subject to different types of security threats. Some security threats relate to networking and computer security for client devices used by members of an entity, such as a business, organization or other enterprise. Malware is an example of such a security threat. Malware can pose a threat to an individual user and that user's devices, as well as possibly threatening an entity associated with the user. The emergence of exploit toolkits permits attackers to easily create new malware variants that can avoid current detection technologies. Users or members of an entity can become victims of malware-based attacks through a plethora of different infection vectors including but not limited to visiting suspicious web sites, connecting machines or devices to untrusted networks, using infected universal serial bus (USB) drives, etc.

SUMMARY

Illustrative embodiments of the present invention provide techniques for the classification of software modules, including potentially malicious software modules such as malware. Such techniques in some embodiments advantageously permit for classification of unknown software modules as being either benign or potentially malicious without relying solely on signature matching or binary analysis. Accordingly, a network security system used in classification of software modules can exhibit improved performance as well as enhanced security against attacks including malware attacks.

In one embodiment, a method comprises obtaining at least a first software module not classified as benign or potentially malicious, extracting a set of features associated with the first software module, the set of features comprising one or more static features, one or more behavior features and one or more context features, identifying a first cluster, the first cluster comprising one or more known software modules previously classified as benign, computing distance metrics between the extracted feature set of the first software module and feature sets of respective ones of the known software modules in the first cluster, classifying the first software module as one of benign and potentially malicious based on a comparison between the computed distance metrics and a neighborhood distance metric, the neighborhood distance metric being based on distances between feature sets of the known software modules in the first cluster, and modifying access by a given client device to the first software module responsive to classifying the first software module as potentially malicious, wherein the method is performed by at least one processing device comprising a processor coupled to a memory.

The processing device may be implemented, for example, in one or more network devices in a computer network, in a security operations center of an enterprise, or in a security analytics system or other type of network security system associated with the computer network or an enterprise.

These and other illustrative embodiments include, without limitation, methods, apparatus, networks, systems and processor-readable storage media.

BRIEF DESCRIPTION OF THE DRAWINGS

FIG. 4 is a table showing an example dataset in an illustrative embodiment.

FIG. 7 is a table showing an example feature set in an illustrative embodiment.

FIG. 11 is a table showing a ranking of different features in an illustrative embodiment.

FIG. 13 is a table detailing software modules detected as outliers in an illustrative embodiment.

DETAILED DESCRIPTION

Illustrative embodiments of the present invention will be described herein with reference to exemplary computer networks and associated computers, servers, network devices or other types of processing devices. It is to be appreciated, however, that the invention is not restricted to use with the particular illustrative network and device configurations shown. Accordingly, the term "computer network" as used herein is intended to be broadly construed, so as to encompass, for example, any system comprising multiple networked processing devices.

Figure 1:
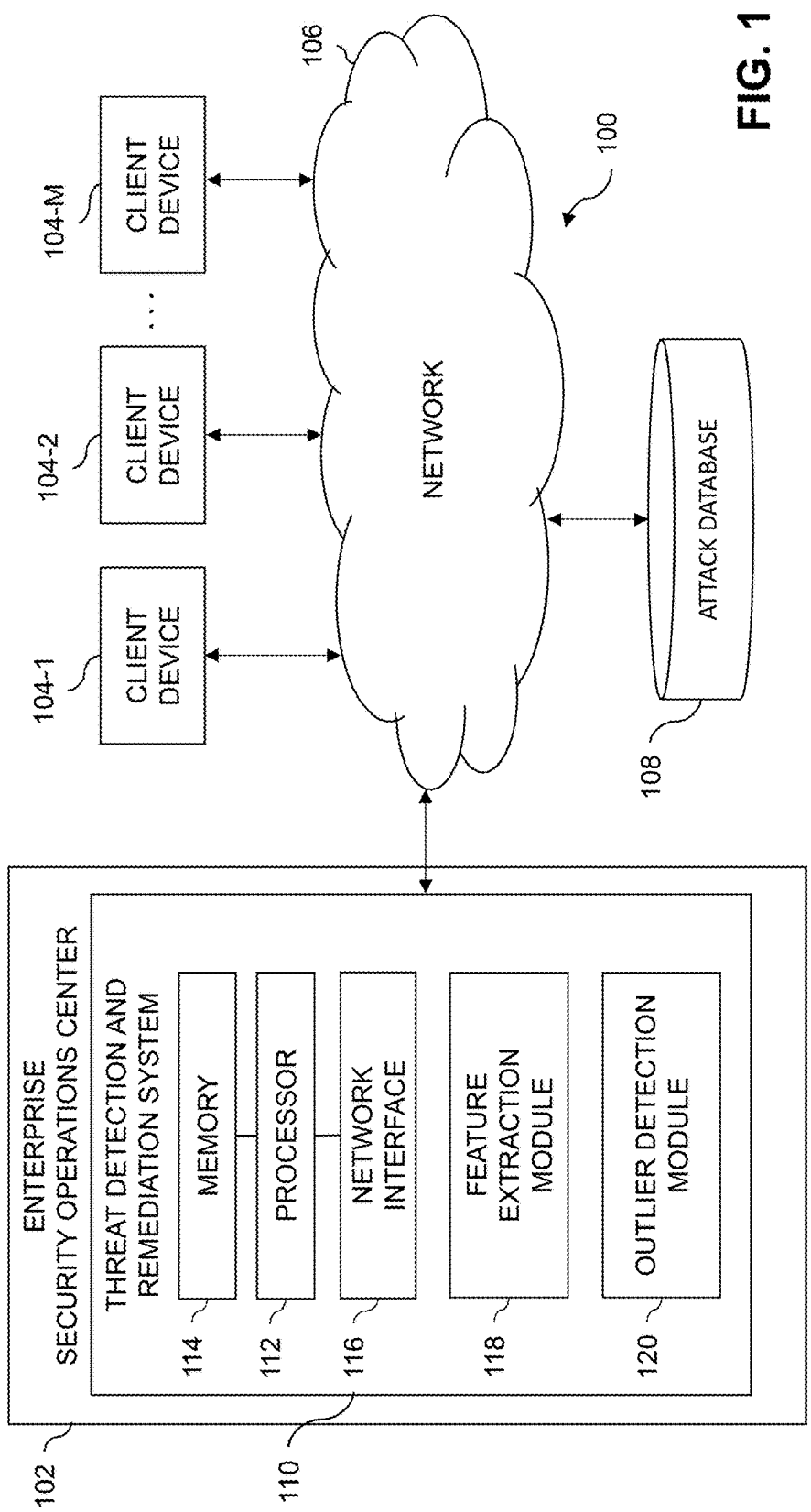
FIG. 1 is a block diagram of an information processing system for classifying software modules in an illustrative embodiment of the invention.

FIG. 1 shows a computer network 100 configured in accordance with an illustrative embodiment of the invention. The computer network 100 comprises an enterprise security operations center (SOC) 102 and a plurality of client devices 104-1, 104-2, . . . 104-M, collectively referred to herein as client devices 104. The client devices 104 are coupled to a network 106, where the network 106 in this embodiment is assumed to represent a sub-network or other related portion of the larger computer network 100. Accordingly, elements 100 and 106 are both referred to herein as examples of "networks" but the latter is assumed to be a component of the former in the context of the FIG. 1 embodiment. Also coupled to the network 100 is an attack database 108, which may store information relating to previously classified or known software modules, including clusters of such previously classified or known software modules.

Software modules, such as executables (EXEs) and dynamic link library (DLL) modules or DLLs, may be malicious. While various embodiments are described below in the context of classifying EXEs and DLLs, embodiments are not limited solely to classifying these types of software modules. The techniques described below in the context of EXE and DLL software modules may be adapted for use with other types of software modules or more generally other types of files that are potentially malicious.

The client devices 104 may comprise, for example, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers."

The client devices 104 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

The network 106 is assumed to comprise a global computer network such as the Internet, although other types of networks can be part of the computer network 100, including a wide area network (WAN), a local area network (LAN), a satellite network, a telephone or cable network, a cellular network, a wireless network such as a WiFi or WiMAX network, or various portions or combinations of these and other types of networks. The computer network 100 in some embodiments therefore comprises combinations of multiple different types of networks each comprising processing devices configured to communicate using IP or other related communication protocols.

The attack database 108, as discussed above, is configured to store and record information relating to threats and attacks including information related to previously classified software modules. The attack database 108 may, in some embodiments, more particularly store a blacklist of known malicious or potentially malicious software modules or other information characterizing known malicious or potentially malicious software modules such as previous patterns of attack used by known malicious or potentially malicious software modules. In other embodiments, various additional or alternative information may be stored in attack database 108, such as a whitelist of known benign previously classified software modules or information associated with known benign software modules.

The attack database 108 in some embodiments is implemented using one or more storage devices associated with the enterprise SOC 102. Such storage devices may comprise, for example, storage products such as VNX® and Symmetrix VMAX®, both commercially available from EMC Corporation of Hopkinton, Mass. A variety of other storage products may be utilized to implement at least a portion of the storage devices associated with the enterprise SOC 102.

Although not explicitly shown in FIG. 1, one or more input-output devices such as keyboards, displays or other types of input-output devices may be used to support one or more user interfaces to the enterprise SOC 102, as well as to support communication between the enterprise SOC 102 and other related systems and devices not explicitly shown.

In the present embodiment, alerts or notifications generated by a threat detection and remediation system 110 of the enterprise SOC 102 are provided over network 106 to client devices 104, or to a system administrator, information technology (IT) manager, or other authorized personnel via one or more security agents. Such security agents may be implemented via the client devices 104 or by other computing or processing devices associated with a system administrator, IT manager or other authorized personnel. Such devices can illustratively comprise mobile telephones, laptop computers, tablet computers, desktop computers, or other types of computers or processing devices configured for communication over network 106 with the enterprise SOC 102 and the threat detection and remediation system 110. For example, a given security agent may comprise a mobile telephone equipped with a mobile application configured to receive alerts from the enterprise SOC 102 or the threat detection and remediation system 110 and to provide an interface for the security agent to select particular remedial measures for responding to the alert or notification. Examples of such remedial measures may include blocking access to one or more potentially malicious software modules, removing potentially malicious software modules from one or more of the client devices 104, requiring potentially malicious software modules to be run in a sandboxed or other protected environment on one or more of the client devices 104, requiring user input or authentication to obtain or run potentially malicious software modules, etc.

It should be noted that a "security agent" as the term is generally used herein may comprise an automated entity, such as a software entity running on a processing device. Accordingly, a security agent need not be a human entity.

As shown in FIG. 1, the enterprise SOC 102 comprises threat detection and remediation system 110. As will be described in further detail below, the threat detection and remediation system 110 is configured to classify software modules, including potentially malicious software modules.

Although shown as an element of the enterprise SOC 102 in this embodiment, the threat detection and remediation system 110 in other embodiments can be implemented at least in part externally to the enterprise SOC 102, for example, as a stand-alone server, set of servers or other type of system coupled to the network 106. In some embodiments, the threat detection and remediation system 110 may be implemented at least in part within one or more of the client devices 104.

The threat detection and remediation system 110 in the FIG. 1 embodiment is assumed to be implemented using at least one processing device. Each such processing device generally comprises at least one processor and an associated memory, and implements one or more functional modules for controlling certain features of the threat detection and remediation system 110.

More particularly, the threat detection and remediation system 110 in this embodiment comprises a processor 112 coupled to a memory 114 and a network interface 116.

The processor 112 illustratively comprises a microprocessor, a microcontroller, an application-specific integrated circuit (ASIC), a field-programmable gate array (FPGA) or other type of processing circuitry, as well as portions or combinations of such circuitry elements.

The memory 114 illustratively comprises random access memory (RAM), read-only memory (ROM) or other types of memory, in any combination. The memory 114 and other memories disclosed herein may be viewed as examples of what are more generally referred to as "processor-readable storage media" storing executable computer program code or other types of software programs.

Articles of manufacture comprising such processor-readable storage media are considered embodiments of the present invention. A given such article of manufacture may comprise, for example, a storage device such as a storage disk, a storage array or an integrated circuit containing memory, as well as a wide variety of other types of computer program products. The term "article of manufacture" as used herein should be understood to exclude transitory, propagating signals.

The network interface 116 allows the threat detection and remediation system 110 to communicate over the network 106 with the client devices 104, and illustratively comprises one or more conventional transceivers.

The processor 112 further comprises a feature extraction module 118 and an outlier detection module 120. The feature extraction module 118 is configured to obtain at least a first software module not classified as benign or potentially malicious, possibly from one of the client devices 104. The feature extraction module 118 is also configured to extract a set of features associated with the first software module, the set of features comprising one or more static features, one or more behavior features and one or more context features. The static features may be extracted from the first software module itself, while the behavior and context features may be extracted from client devices 104.

The outlier detection module 120 is configured to identify a first cluster comprising one or more known software modules previously classified as benign. The outlier detection module 120 is also configured to compute distance metrics between the extracted feature set of the first software module and feature sets of respective ones of the known software modules in the first cluster, and to classify the first software module as one of benign and potentially malicious based on a comparison between the computed distance metrics and a neighborhood distance metric. The neighborhood distance metric is based on distances between feature sets of the known software modules in the first cluster. The outlier detection module 120 is configured, in response to classifying the first software module as potentially malicious, to modify access by the client devices 104 to the first software module. Additional details regarding the feature extraction module 118 and outlier detection module 120 will be described in further detail below with respect to FIGS. 2-14.

It is to be appreciated that the particular arrangement of the enterprise SOC 102, threat detection and remediation system 110, feature extraction module 118 and outlier detection module 120 illustrated in the FIG. 1 embodiment is presented by way of example only, and alternative arrangements can be used in other embodiments. As discussed above, for example, the enterprise SOC 102, threat detection and remediation system 110, feature extraction module 118 and/or outlier detection module 120 may in some embodiments be implemented internal to one or more of the client devices 104. As another example, the functionality associated with the feature extraction module 118 and outlier detection module 120 may be combined into one module, or separated across more than two modules with the multiple modules possibly being implemented with multiple distinct processors.

At least portions of the feature extraction module 118 and the outlier detection module 120 may be implemented at least in part in the form of software that is stored in memory 114 and executed by processor 112.

It is to be understood that the particular set of elements shown in FIG. 1 for classification of software modules is presented by way of illustrative example only, and in other embodiments additional or alternative elements may be used. Thus, another embodiment may include additional or alternative systems, devices and other network entities, as well as different arrangements of modules and other components.

By way of example, in other embodiments, the threat detection and remediation system 110 may be implemented external to enterprise SOC 102, such that the enterprise SOC 102 can be eliminated.

In some embodiments, the threat detection and remediation system 110 may be part of or otherwise associated with a system other than the enterprise SOC 102, such as, for example, a critical incident response center (CIRC).

Additionally or alternatively, the threat detection and remediation system 110 can be part of or incorporate an otherwise conventional security analytics system, such as the RSA Security Analytics system commercially available from RSA, The Security Division of EMC Corporation of Hopkinton, Mass.

Other embodiments can implement the threat detection and remediation system 110 as part of or in conjunction with a security information and event management (SIEM) system, such as the enVision® platform, also commercially available from RSA. Such an SIEM system is also considered another possible example of a "network security system" as that term is broadly used herein.

The threat detection and remediation system 110 may be implemented at least in part using one or more processing platforms including public or private cloud infrastructure, or other distributed virtual infrastructure. Such a distributed virtual infrastructure may comprise, by way of example, a hypervisor platform and associated virtual processing and storage elements. An example of a commercially available hypervisor platform suitable for use in an embodiment of the invention is the VMware® vSphere™ which may include an associated management system such as vCenter™.

Other processing platforms may be used to implement threat detection and remediation system 110 in other embodiments, such as different types of virtualization infrastructure in place of or in addition to virtualization infrastructure comprising virtual machines. Such virtualization infrastructure illustratively includes container-based virtualization infrastructure configured to provide Docker containers or other types of Linux containers (LXCs).

As another example, portions of a given processing platform in some embodiments can comprise converged infrastructure such as VxRack™ or Vblock® converged infrastructure commercially available from VCE, the Virtual Computing Environment Company, an EMC Federation Company.

Figure 2:
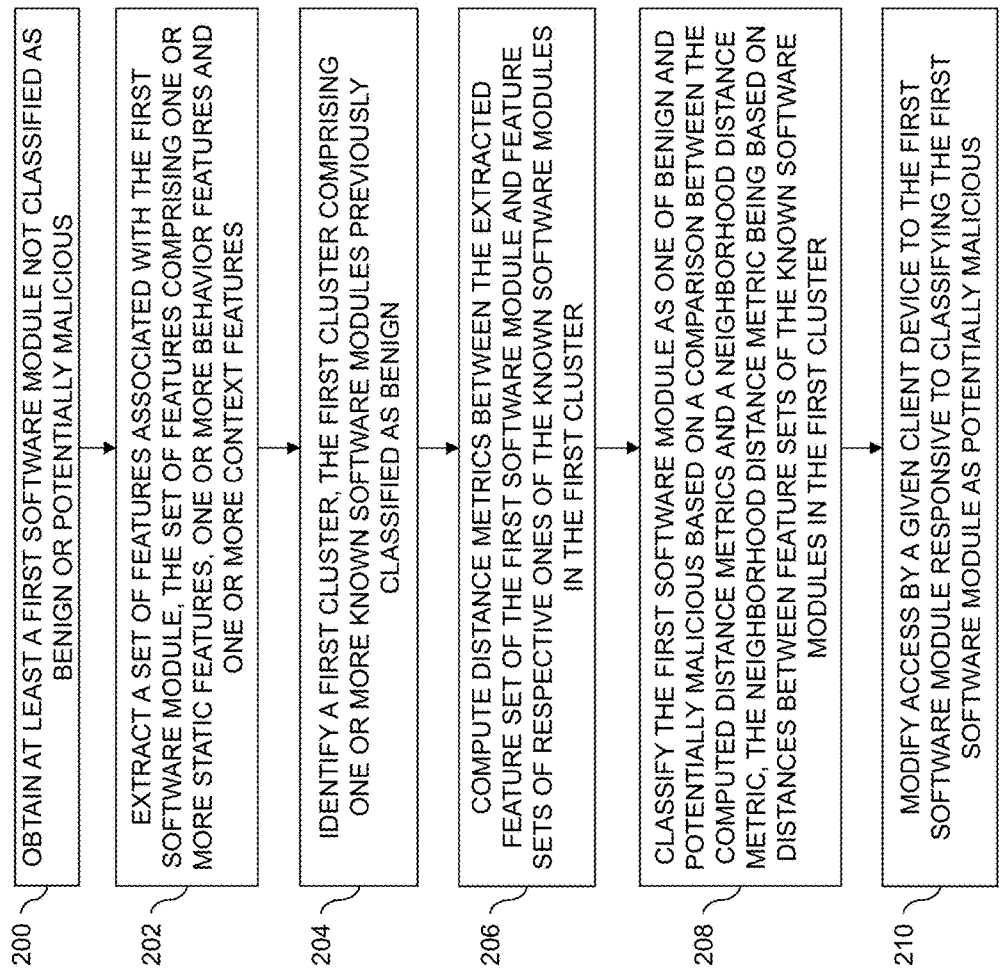
FIG. 2 is a flow diagram of an exemplary process for classifying software modules in an illustrative embodiment.

An exemplary process for classification of software modules will now be described in more detail with reference to the flow diagram of FIG. 2. It is to be understood that this particular process is only an example, and that additional or alternative processes for classification of software modules can be carried out in other embodiments.

In this embodiment, the process includes steps 200 through 210. These steps are assumed to be performed by the processor 112 of the threat detection and remediation system 110 utilizing feature extraction module 118 and outlier detection module 120. The process begins with step 200, obtaining at least a first software module not classified as benign or potentially malicious. The first software module may be obtained from one of the client devices 104, from attack database 108, or from another source including but not limited to a website or other Internet or network source. While FIG. 2 and various embodiments are described herein with respect to a system having two classifications, benign or potentially malicious, embodiments are not so limited. In some embodiments more than two classifications are used, such as benign, adware or malware. Numerous other classifications may be used in other embodiments, including subclasses within one or more of benign, potentially malicious, adware, malware, etc.

In step 202, a set of features associated with the first software module is extracted. The set of features includes one or more static features, one or more behavior features and one or more context features. Extracting the set of features in step 202 may include extracting the static features from the first software module itself and extracting the behavior and context features from client devices 104. Static features include descriptive features, numerical features, binary features, etc. Behavior features include file system access features, process access features, network connection features, etc. Context features include file system path features, path of destination events features, file metadata features, auto-start functionality features, etc.

A first cluster is identified in step 204. The first cluster comprises one or more known software modules previously classified as benign. The known software modules in the first cluster may have filenames that match the filename of the first software module. In some embodiments, filenames may be considered as matching if they are the same as one another. In other embodiments, filenames may be considered as matching if they are the same or substantially similar to one another. For example, edit distance may be used to compare filenames, with a designated threshold being set to account for minor variations in filenames. As an example, the filenames "samplescheduler.exe" and "samplesched.exe" may match one another, as may the filenames "sample.exe" and "samplel.exe" depending on the threshold used. Other types of attributes, such as file description, may be used in addition to or as an alternative to filename for matching the first software module to the first cluster.

The first cluster may have certain properties in some embodiments. For example, the first cluster may include a number of known software modules that exceeds a first threshold. As another example, a ratio of the number of known software modules in the first cluster to all software modules in the first cluster exceeds a second threshold. As a further example, the average distances between feature sets of known software modules in the first cluster is less than a third threshold.

In step 206, distance metrics are computed between the extracted feature set of the first software module and feature sets of respective ones of the known software modules in the first cluster. Computing the distance metrics may include assigning weights to the features extracted in step 202. The weights may, in some embodiments, be uniformly assigned. In other embodiments, the weights may be proportional to the information gain or entropy of respective features in a plurality of software modules including the first software module and the known software modules in the first cluster. The weight assigned to a given feature in the extracted feature set may be based on a dynamic feature weight and a static feature weight. The dynamic feature weight may be based on distances between the value of the given feature for pairs of known software modules in the first cluster, while the static feature weight may be set proportional to an information gain of the given feature in a plurality of software modules including the first software module and the known software modules in the first cluster. In some embodiments, penalty values are assigned to distances between features missing from the extracted feature set of the first software module.

The first software module is classified as one of benign and potentially malicious in step 208 based on a comparison between the computed distance metrics and a neighborhood distance metric. The neighborhood distance metric is based on distances between feature sets of the known software modules in the first cluster. The value of the neighborhood distance metric may be set by computing, for each known software module in the first cluster, a minimum distance between that known software module and other known software modules in the first cluster and then setting the value of the neighborhood distance metric to a maximum of the minimum distances between known software modules in the first cluster.

In some embodiments, classifying the first software module includes identifying a minimum one of the computed distance metrics between the extracted feature set of the first software module and feature sets of respective ones of the known software modules in the first cluster. The first software module is then classified as benign if a ratio of the identified minimum computed distance metric to the neighborhood distance metric is less than a first threshold. Otherwise, the first software module is classified as potentially malicious.

In step 210, access by one or more of client devices 104 to the first software module is modified responsive to classifying the first software module as potentially malicious. Modifying access by the client device to the first software module in step 210 may in some embodiments include removing the first software module from a memory or storage of the client device, preventing the client device from obtaining or storing the first software module in the first place, causing the first software module to be opened in a sandboxed or other protected application environment on the client device, etc.

Modifying access in step 210 may further include generating one or more notifications or alerts to send to one or more of the client devices 104, to one or more network administrators or IT professionals associated with the enterprise, etc. Transmitting the alert or other notification to the client device may utilize one or more APIs of a client device permitting remedial or preventative actions to be taken, such as deleting or quarantining the first software module, causing a pop-up, icon or other warning to be displayed on a screen of the client device warning the user of the potentially malicious nature of the first software module, etc. Transmitting the alert or other notification to the network administrator or IT professional can allow such users to grant or deny access by the client device to the first software module, possibly after further review or analysis of the first software module.

In other embodiments, modifying access in step 210 may include requiring a user of the client device to authenticate in order to access the first software module. In this manner, certain classes of users may be permitted to access potentially malicious software modules while others cannot. As an example, a class of users including IT professionals may benefit from access to potentially malicious software module to confirm whether they are malicious, to refine thresholds for future use in classifying other software modules, etc.

Entities and other organizations are facing an increased number of security or criminal threats ranging from financially motivated and opportunistic malware to more advanced targeted attacks. Security solutions, like signature matching, can be ineffective due to the rapid production of malware and other malicious or potentially malicious software modules. It is estimated that in 2014 alone, 75 million new malware samples have been generated, compared with 30 million samples generated in 2013. With the emergence of exploit toolkits, attackers can easily create new malware variants that avoid detection schemes that rely on signature matching or binary analysis. In some cases, malware is designed to mimic the behaviors or representation of legitimate software, blurring their boundaries and making malware hard to be discerned by manual or automated analysis.

To complement security products such as antivirus software, organizations may deploy host agents on corporate machines that monitor their various activities (installed programs, running processes, services, scheduled tasks, network connections, etc.), record events of interest and issue alerts when suspicious activities are detected. These monitoring techniques at the end point prominently improve visibility into user machines' activities and provide protection even outside the enterprise's border. Since stringent requirements may be imposed on these tools to not interfere with users' regular activities, they can be lightweight in the amount of data collected and recorded for analysis.

In some embodiments, host data collected from such host agents is analyzed and used to classify unknown software modules. Host agents are examples of the above-described security agents running on client devices 104. An unknown software module refers to a software module that has not been previous classified as benign, potentially malicious, or some other category such as malware, adware, etc. Host data can be used to detect potentially malicious software modules that may be overlooked by other security controls such as antivirus or other security software. Potentially malicious software modules, also referred to herein as suspicious modules, may be EXE or DLL files with unique hashes.

Various embodiments are described below in the context of a sample data set, wherein host data is collected from a large, geographically distributed organization including 40,000 Windows® machines. The dataset includes a number of attributes captured from 1.8 million distinct Windows® modules installed across the enterprise hosts. Among these, 117,000 modules are labeled as whitelisted or legitimate and 534 are labeled as blacklisted or malicious. A large majority of the modules (above 90%) are unknown software modules.

In some embodiments, an outlier-detection method is used to determine malicious or potentially malicious software modules that are impersonating benign software modules. The benign software modules include legitimate files such as Windows® processes or software installers. In some cases, an attack or security threat leverages the reputation of benign software modules by impersonating certain static features of benign software modules such as their filename, company, description, etc. Suspicious software modules, however, may exhibit differences in behavioral and context features compared to legitimate or benign software modules. In some embodiments, whitelisted or benign software modules are arranged in a set of coarse clusters. Unknown software modules may be placed in or compared with these coarse clusters to determine whether they are benign or potentially malicious. Potentially malicious unknown software modules may be those whose distance to other whitelisted software modules in a given coarse cluster exceeds some threshold, such as the neighborhood distance between whitelisted software modules in the given coarse cluster. An unknown software module can thus be classified as an outlier (e.g., potentially malicious), if its distance to whitelisted modules in the given coarse cluster is larger than the typical distance between whitelisted software modules in the given coarse cluster.

Host data presents a number of challenges for analysis. In a large and geographically distributed organization, the machines or other client devices present a heterogeneous environment as users may install custom software on their machines. Limited ground truth also presents a challenge. For example, in the sample dataset less than 10% of the software modules are labeled as whitelisted (legitimate) or blacklisted (malicious). Host data may also provide a noisy dataset, as some scan results may be missed due to machine reboots or other events. The lightweight nature of the host agents or other instrumentation can result in coarse-grained event capturing and aggregated features. For example, host agents may be running on users' work machines and be designed so as to minimize impact on the users' regular activities.

Some embodiments provide an outlier-detection algorithm to identify malware or other malicious or potentially malicious software modules that impersonate the filenames or other characteristics of well-known popular software or, more generally, benign software modules. A set of static, behavioral and contextual features are leveraged to model different aspects of software modules. In the sample dataset, the algorithm detected 44 outlying software modules in a set of 7,000 unknown software modules belonging to coarse clusters created by popular whitelisted software modules within the enterprise. Among the 44 outlying software modules, 12 were already blacklisted and 25 were confirmed malicious through manual investigation, bringing precision to 84.09%.

Embodiments also provide algorithms for automatically deriving feature weights for computing distance between software modules. The algorithm is able to adjust feature weights and highlight the ones that differentiate blacklisted from whitelisted software modules best. In addition, the algorithm provides resilience to missing attributes and noise in the data. For these purposes, static weights proportional to a feature's information gain are combined with dynamic weights. The static weights measure feature importance in distinguishing blacklisted from whitelisted software modules, while the dynamic weights measure feature stability within a coarse cluster.

Users, such as users of client devices 104, can become victims of malware attacks through a plethora of different infection vectors, including but not limited to visiting suspicious web sites, connecting the client devices 104 to untrusted networks, using infected USB drives, opening email or email attachments, phishing email, drive-by-download attacks, etc. As users work remotely more often, and various entities permit or encourage bring your own device (BYOD) arrangements for corporate and other types of networks, the entities themselves become indirect victims of malware or criminal activities. In some cases, entities are the targets of more advanced attacks. As an example, certain types of malware such as malware droppers or watering hole attacks may seek to infect or attack an entity by compromising client devices or users of that entity. Undetected malicious activities, as well as malicious activities that are not detected quickly, can lead to costly data breaches for entities or users.

As described above, host agents may be deployed on user machines or client devices 104 to obtain better visibility into users' activities and offer protection outside of the enterprise perimeter. Host agents may monitor processes running on end hosts, binaries downloaded from the web, modifications to system configuration or registries, etc. through lightweight instrumentation.

In the sample dataset, 40,000 machines are instrumented with host agents that perform regular scans, collect aggregate behavioral events and send them to a centralized server such as threat detection and remediation system 110. Some embodiments can start with a set of whitelisted or known software modules previously classified as benign or legitimate, and attempt to detect malicious or potentially malicious software modules that impersonate the whitelisted software modules. Filename impersonation, for example, may be successfully used by some attackers to evade detection. For instance, certain advanced persistent threat (APT) campaigns may use filenames of key system processes for evasion, such as svchost.exe, Iexplore.exe, or Wiinzf21.dll. ZeroAccess, a family of rootkits, can overwrite certain functions of system files such as services.exe to load malicious routines. Detecting such malware in isolation is difficult, but may be successfully detected in some embodiments through host data analysis in an enterprise environment where such software modules are significantly different from legitimate software modules that they try to impersonate.

Host data analysis presents a number of challenges as discussed above. In the sample dataset, for example, 1.8 million distinct modules installed across 40,000 machines are collected from a heterogeneous environment. In some cases, users have administrative rights on their machines and can install software of their choice. The limited ground truth in the sample dataset also presents a challenge, as less than 10% of the software modules are labeled as whitelisted or blacklisted and the majority have unknown status. Many software modules in the sample dataset have certain attributes or feature values that are missing due to machines being outside the corporate network for extended periods of time or users rebooting their machines before sending scan results to the centralized server. Also, the nature of the host agents in the sample dataset means that only lightweight information is collected, mostly upon scanning the machines, due to the requirement of not impacting user's regular activities. Several coarse-grained behavioral events may be collected on a continuous basis, for instance writes and renames of executable files, creation and opening of new processes, network access information, etc. but these coarse-grained behavioral events are aggregated across time. Other features may only be collected when scanning the machine, a process scheduled on average once every three days.

In analyzing the sample dataset, it is assumed that users' machines are subject to infection through different attack vectors as discussed above. However, it is assumed that the agent monitors running on the end hosts are not tampered with and are able to collect and upload information to a central server such as threat detection and remediation system 110 or attack database 108. The server storing the data extracted from end hosts is protected within the enterprise's perimeter and not subject to adversarial compromise. Breaches involving a compromise of monitoring tools or servers in the organization are much more serious and can be detected through additional defenses.

Figure 3:
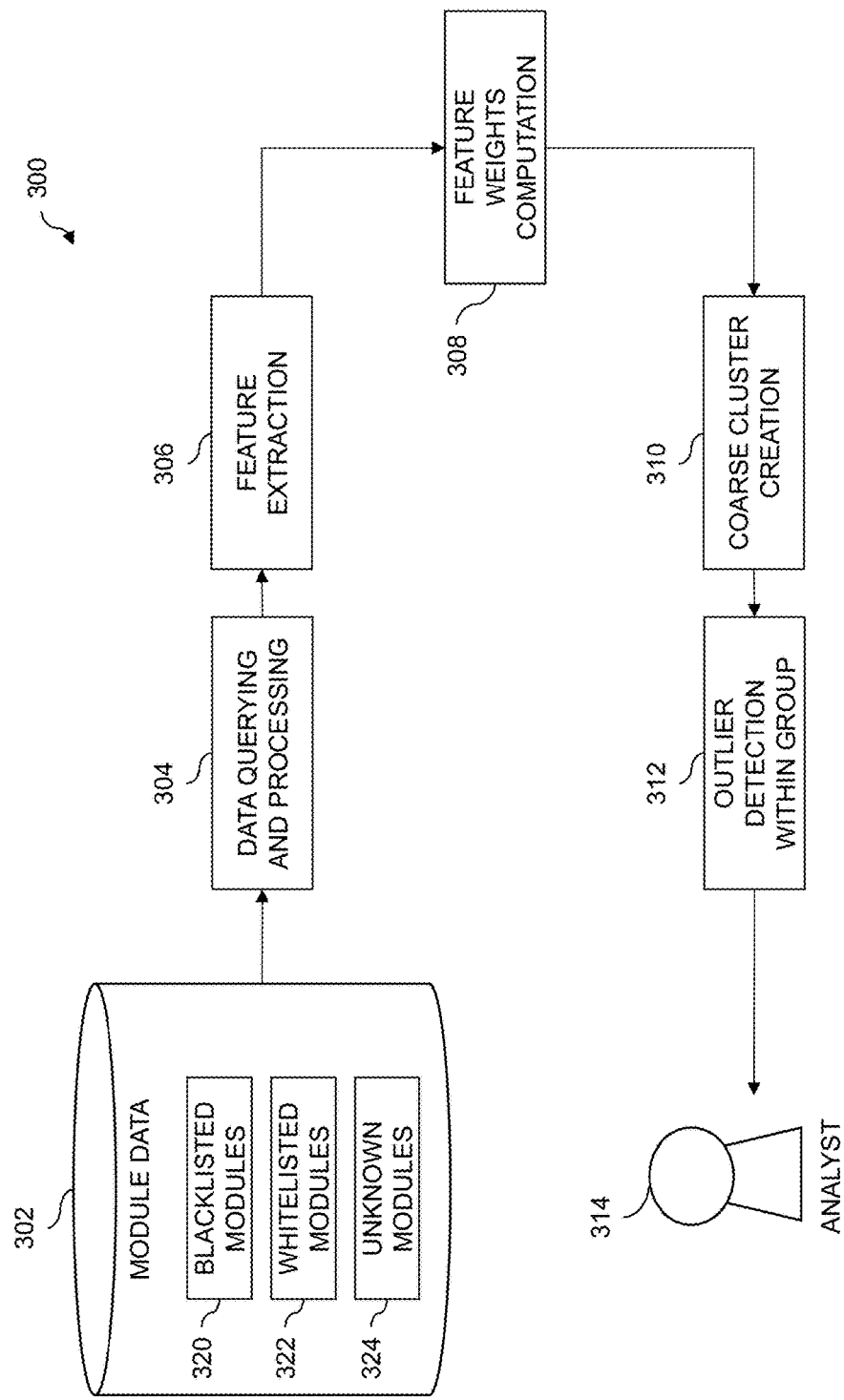
FIG. 3 is a flow diagram of another exemplary process for classifying software modules in an illustrative embodiment.

FIG. 3 shows a system process flow 300 which may be used for classifying software modules. The system analyzes data collected from host agents deployed in an enterprise, with the goal of identifying, among the unknown software modules, potentially malicious software modules that are impersonating benign, legitimate or otherwise whitelisted software modules and that exhibit suspicious behaviors. The potentially malicious software modules can be provided to security analysts for further investigation in some embodiments. The analysis uses a number of features from three categories—static, behavioral and contextual. Static features may be extracted from a software module's portable executable (PE) header. Behavioral features may capture various file access patterns, process creation and network access events. Contextual features may be related to a software module's location on the machines where it is installed.

System 300 shows module data 302, which includes blacklisted software modules 320, whitelisted software modules 322 and unknown software modules 324. The module data 302 may be stored in a database such as attack database 108. Data querying and processing module 304 obtains software modules and related data. Feature extraction module 306 processes the module data 302 obtained by the data querying and processing module 304 to extract static, behavioral and contextual features. Feature weights computation module 308 defines a distance metric between software modules. The distance metric may be defined as a weighted sum of feature values. In some embodiments, higher weights are given to features that distinguish malicious and legitimate modules best through information gain.

Coarse cluster creation module 310 creates coarse clusters, each of which includes a set of whitelisted software modules that are potential targets for attack. Outlier detection within group module 312 applies an outlier detection algorithm to identify software modules that are at larger distance than the typical distance between legitimate or benign software modules within a coarse cluster. Results from the outlier detection module within group module 312, such as unknown software modules that are classified as potentially malicious, may be provided to an analyst 314 for further review.

As mentioned above, the sample dataset was collected from host agents deployed on 40,000 Windows® machines monitoring different attributes of installed software modules. In the sample dataset, the software modules were Windows® EXE or DLL files with unique MD5 hashes. Embodiments, however, are not limited solely to use with software module that are Windows® EXE or DLL files. Various other types of software modules may be classified using the techniques described herein.

Detailed information on the installed software modules of the sample dataset are stored in an SQL database, such as attack database 108. The first time a software module's MD5 hash is encountered, general information about that software module is stored in a table. The general information includes module creation time, size, signature, and many other static fields available in the PE header. Additionally, for each instance of the software module created on a host, a separate entry is maintained in the database storing information on that particular instance, e.g., its exact location in the file system on the host machine, network connections observed, registry modifications, auto-start functionality, etc.

The particular results described herein are based on a snapshot of the database that included 1.8 million distinct MD5 hashes. Among these, 117,000 were marked or classified as whitelisted or benign software and 534 were classified as blacklisted or related to malicious or potentially malicious software. This ground truth was obtained using a combination of custom tools, labeling by domain experts in the organization, detailed manual investigation by security analysts, etc. The remaining approximately 1.7 million software modules are unknown software modules that are not previously classified as benign or potentially malicious. The 1.7 million software modules include lesser-known applications as well as variants of known applications. The sample dataset included 301,000 distinct filenames.

FIG. 4 shows a table 400, showing the total number of software modules in each category, where BL denotes blacklisted, WL denotes whitelisted and UL denotes unknown software modules. The table 400, in addition to listing the total number of software modules in each category, also lists the number of software modules in each category missing certain feature values such as description, company name and signature fields. Some software modules have missing attributes, which can affect feature extraction. The noisy aspect of the sample dataset is illustrated by table 400. As seen in the table 400, the large majority of blacklisted software modules do not include description, company name and signature fields. A large number of unknown software modules are also missing these fields. For example, 88% of the unknown software modules are unsigned. Although most whitelisted software modules include these fields or static features, there are still thousands of whitelisted software modules missing one or more of these fields.

Figure 5:
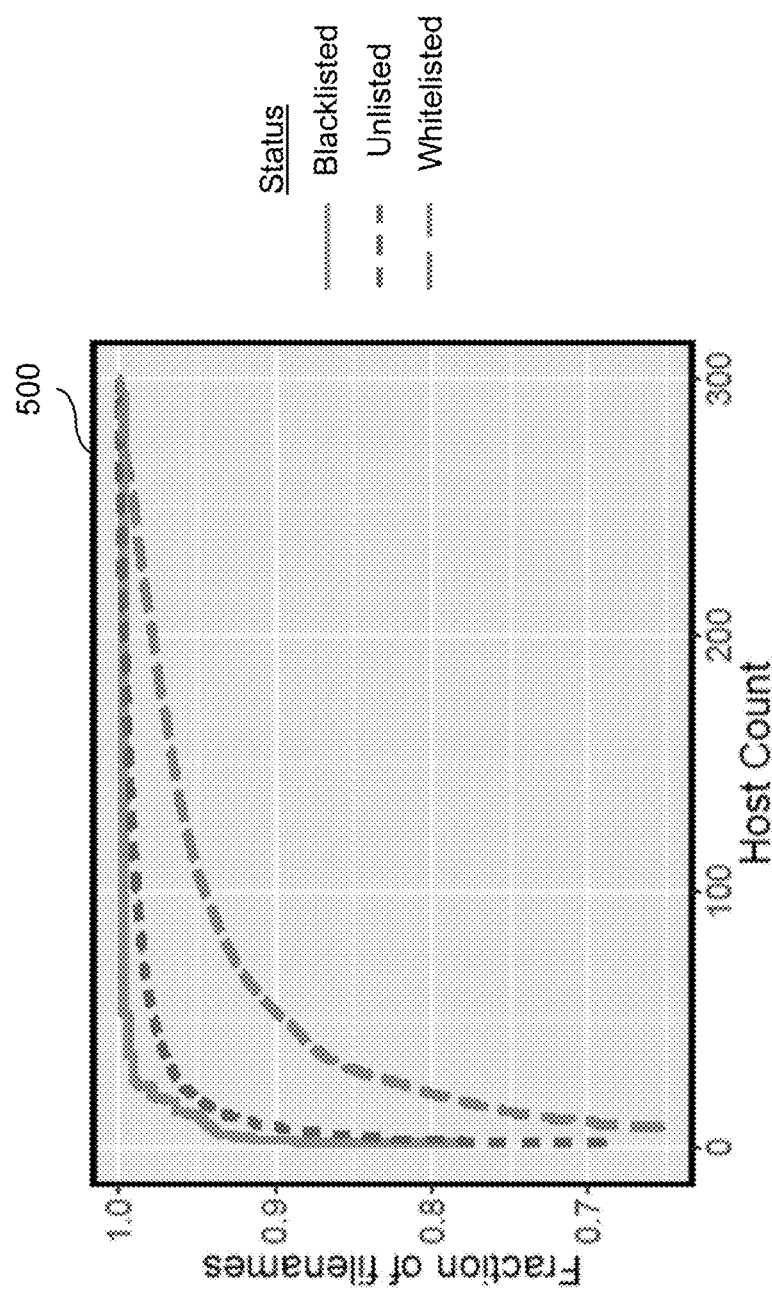
FIG. 5 is a plot showing the number of hosts installing the same filename in an illustrative embodiment.

FIG. 5 shows a plot 500 of the number of hosts installing the same filename. The plot 500 shows the cumulative distribution function (CDF) for the number of hosts installing the same filename. The large majority of filenames are installed on few hosts relative to the population. Even among whitelisted filenames, 95% of them are installed on less than 100 hosts. 95% of the blacklisted files are installed on less than 20 hosts. Only a small percentage of files are extremely popular (e.g., whitelisted svchost.exe and unknown presentationcore.ni.dll are installed on 36K and 29K machines, respectively).

Figure 6:
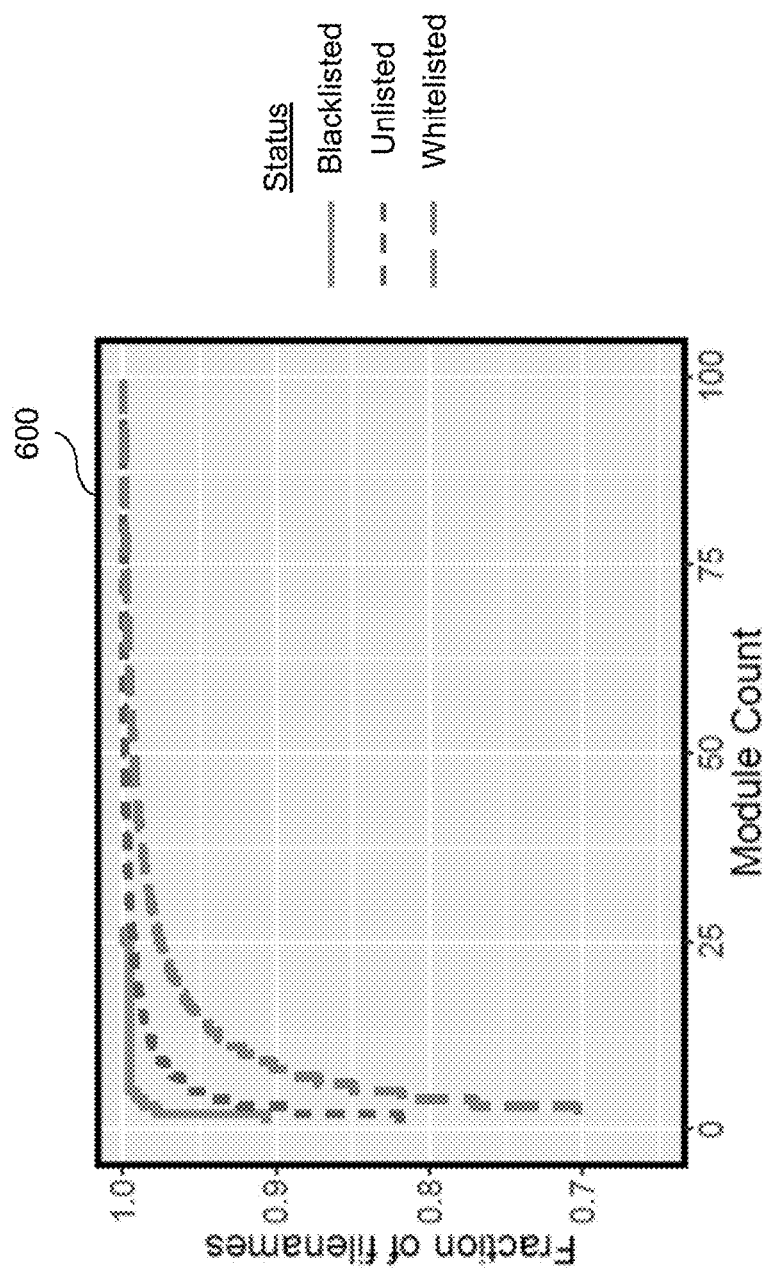
FIG. 6 is a plot showing the number of software modules sharing the same filename in an illustrative embodiment.

FIG. 6 shows a plot 600 of the number of software modules sharing the same filename but with distinct MD5 hashes. The plot 600 shows the CDF for the number of file variants with same filename but distinct MD5 hash. Whitelisted and unknown filenames include more variants than blacklisted modules. Some whitelisted files have many different variants, with setup.exe including 1300 variants and java.exe having more than 400 variants. Among the set of unknowns, microsoft.visualstudio~.dll has the maximum number of distinct modules (26K). On the other hand, blacklisted files have fewer variants (the maximum number is 25 for file msbuonj.exe). This is due to the limited number of blacklisted modules available in the sample dataset, as well as the fact that malware tends to change filenames in different variants to avoid detection by blacklisting tools. It is to be appreciated that, throughout this description, the particular numbers given are representative of the sample dataset used but not necessarily of all possible datasets. Certain trends are expected to hold true regardless of environment, such as that malware tends to change filenames in different variants, or that blacklisted and unknown software modules are expected to have missing features, etc. Differences, however, may occur based on the particular environment or other circumstances.

In some embodiments, a goal is to detect or classify potentially malicious software modules that attempt to impersonate popular filenames, such as system processes, software installers, etc. through an outlier-detection algorithm. In other embodiments, however, the outlier-detection algorithm may be used to detect or classify other types of software modules in other circumstances. For example, the outlier-detection algorithm may be used to determine if a given software module is an outlier relative to other software modules in a cluster without necessarily classifying the given software module as potentially malicious. As another example, while embodiments are described herein primarily in the context of coarse clusters of known whitelisted modules, coarse clusters may in some cases include blacklisted or malicious software modules, graylisted or adware software modules, or some other type of software module.

In some embodiments, as discussed above, the outlier-detection algorithm uses feature sets extracted from software modules or the host machines installing the software modules. Features may be categorized as static, behavioral and context-based or contextual. Feature weights and distance metrics between software modules may be determined by computing information gain on the host data. Unknown software modules may be classified as suspicious or potentially malicious if they are distant from a cluster of whitelisted software modules having a same file attribute such as a same filename.

For each software module, a multi-dimensional feature vector or feature set may be extracted. Individual features can capture the software module's attributes.

Static features include features extracted from the software modules themselves, and include descriptive features, numerical features and binary features. Some static features may be extracted from the PE header of a software module. Descriptive features include, by way of example, features represented as string values such as description and company name as well as sets such as the names of imported DLLs and section names, etc. Numerical features include, by way of example, file size, PE size, PE timestamp, module entropy, etc. Binary features denote different module attributes including, by way of example, signature present, signature valid, icon present, version information present, PE type (e.g., 32 or 64 bit), PE machine type (e.g., Intel 386, AMD64 etc.), module packed, module uses the Windows® native API, module is compiled with .NET framework, etc.

Many static features, such as company, description, set of imported DLLs, etc., can be easily evaded by malware to look legitimate or include empty values. A large number of blacklisted software modules in the sample dataset (367 out of 534) are in fact missing at least two static features. To account for this, some embodiments augment the static features with behavioral and contextual features.

Behavior features include file system access features, process access features, and network connections features. File system access features include, by way of example, executable files created, deleted or renamed, files read, physical or logical drives opened, etc. Process access features include, by way of example, regular process, browser or OS process opened, process or remote threads created, etc. Network connection features include, by way of example, a set of domains and IP addresses that the module connects to, the number of unique domains and IP addresses that the module connects to, etc. Various ones of the file system, process access and network connection features may be numerical features, such as counting the number of events with unique destinations per machine. For each event, the full path of both the source file or process and the destination file or process may also be used as behavior features. Events may be stored cumulatively at a server or database since the time a software module is first observed. At each scan, stored events in the database may be combined with new behavioral events reported by host agents on the client devices 104. Since the same software module may be installed on multiple machines or client devices, the average number of events per machine may be used for certain behavioral features, such as features related to file system or process access.

As mentioned above, in some embodiments host agents on the client devices 104 may have certain constraints. For example, the host agents may be lightweight or otherwise designed so as not to interfere with normal use of the client device by a user. Because of these constraints, host agents on client devices 104 may not have the flexibility to extract additional data. For example, in the sample dataset, the host agents collected information about the set of domains and IP addresses a software module connects to, but not the details on individual connections. In such cases, aggregated behavioral features may be defined. In other embodiments, however, host agents on client devices 104 may not have such constraints and thus additional or more detailed information may be collected.

Host agents on the client devices 104 may collect information representing the context of the software module. For example, host agents may collect information about the time when a software module is initially observed on every machine, its full file system path for installation, the user account that created the software module, and the full path of all files and processes captured by the behavior events initiated by the software module. The file system path of a software module may be parsed so as to assign the software module to different categories such as Windows, Systems, Program Files, ProgramData, AppDataLocal, AppDataRoaming, user-specific, etc. Additionally, the host agents may monitor whether software modules have auto-start functionality (e.g., whether a software module can run without being invoked by a user) and categorizes the auto-start functionality into different types such as logon, services, service DLL, boot, startup, scheduled task, etc. The host agents may also monitor or collect information relating to the user name owning the software module and categorize the user name as an administrator, trusted installer, regular user, etc.

Context features may be extracted from the information collected by the host agents. Context features include file system path features, path of destination features, metadata features, auto-start functionality features, etc. File system path features include, by way of example, the number of directory levels in the path, the path category, the number of other executable and non-executable files in the same folder, the number of sub-folders, etc. The path of destination events features include, by way of example, the path category of destination files extracted from behavior events, number of events that are in the same and in different paths from the source software module, etc. File metadata features include, by way of example, file owner, hidden attributes, days of creation, etc. Auto-start functionality features include, by way of example, whether the software module has auto-start functionality, the type of auto-start enabled, etc.

For certain path-related features, binary features for different path categories such as Windows, Systems, Program Files, etc. are created. A path might have multiple binary features enabled, for example, the module may be in both Systems and Windows paths. Similarly, binary features may be created for each type of auto-start capability, for different types of owner accounts, etc. Numerical features and binary features may be averaged across all client devices installing a software module.

In the sample dataset, the feature set used included 52 features. FIG. 7 shows a table 700 of the features used in the sample dataset. Table 700, however, does not show an exhaustive list of all possible features that may be used. For example, in the sample dataset features were selected only if they were available in at least 10 blacklisted software modules. Some features related to registry modifications, process and I/O activity were not encountered in the blacklisted software modules of the sample dataset, but may be in other datasets. In addition, it is to be appreciated that embodiments need not use all of the features shown in table 700. As will be discussed in further detail below, features may be ranked by their ability to distinguish between whitelisted and blacklisted software modules. Some embodiments may only utilize features that meet a certain threshold ability to distinguish between whitelisted and blacklisted software modules. In addition, the features used may depend on the availability of such information in the type of software modules being analyzed. Certain features may be specific or more useful just for EXEs or just DLLs. For example, the AutoServiceDLL feature is specific to DLL software modules. Certain behavior and context features may be specific to EXE software modules, etc.

In some embodiments, to detect potentially malicious software modules impersonating popular, legitimate or otherwise whitelisted software modules, a large machine base is leveraged to determine the set of popular software modules and their common characteristics across machines. While it may be relatively easy for malware or other potentially malicious software modules to inherit some of the static features of popular software modules to appear legitimate, in order to implement its functionality malware will often exhibit differences in its behavioral and contextual features relative to legitimate applications. This observation is leveraged to detect potentially malicious software modules that impersonate popular filenames, such as those used by system processes or installers, or other attributes of popular or other whitelisted software modules.

In some embodiments, classification of an unknown software module proceeds in two steps or phases. In a first step or phase, a set of coarse clusters are generated. The coarse clusters include large majorities of software modules that are popular or whitelisted software modules installed on the host base. In the second step or phrase, outliers in the coarse clusters are identified as software modules in a given coarse cluster whose distance to whitelisted software modules in the given cluster is larger than the typical distance between whitelisted software modules in the given coarse cluster. A list of detected outliers may be prioritized to consider most risky outliers as the ones with the largest distance from legitimate or whitelisted software modules. Various details regarding feature weight selection, distance computation and outlier detection are described below.

Figure 8:
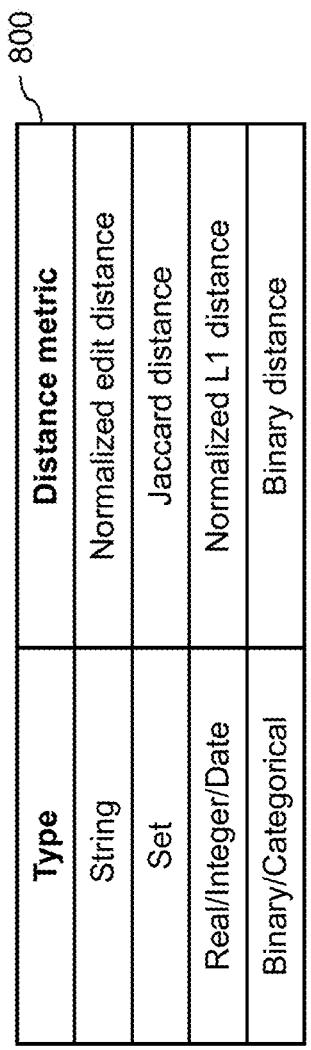
FIG. 8 is a table showing examples of distance metrics for different types of features in an illustrative embodiment.

In some embodiments, standardized distance metrics are used for the features according to the feature's type. FIG. 8 shows a table 800 summarizing distance metrics used for each feature type. For string values, a normalized edit distance is used. Normalized edit distance may be defined as the edit distance divided by the length of a maximum string. For set values, Jaccard distance is used. Jaccard distance between two sets A and B may be defined as $|A \cap B|/|A \cup B|$. For real and integer values, a normalized L1 distance is used. Normalized L1 distance may be defined as $d(x, y)=|x-y|/\max\{x, y\}$. For date values, differences are derived from a pre-defined base value, and L1 distance is applied on the derived differences. For binary and categorical values, binary distance is used. Binary distance may be defined as $d(x, y)=1$, if $x=y$, and $d(x, y)=0$, otherwise. The distance between two software modules $M_1=(x_1, \ldots, x_n)$ and $M_2=(y_1, \ldots, y_n)$ is a weighted sum of distances for individual features: $d(M_1,M_2)=\Sigma_{i=1}^{n}w_i d(x_i,y_i)$ where $\Sigma_{i=1}^{n}w_i=1$. The weights $w_i$ will be discussed in further detail below.

For different features, different weights may be assigned. In some embodiments, the weights are selected so as to highlight (e.g., give higher weight to) features that are good at distinguishing between benign and potentially malicious software modules. Towards this goal, some embodiments compute information gain of the whole set of features over all whitelisted and blacklisted modules and define static weights proportional to the feature's information gain. Information gain is an entropy-based measure that quantifies intuitively the increase in entropy for each feature.

Assume that $X=(X_1, \ldots, X_n, y)$ is the dataset with n features and label y (e.g., blacklisted or whitelisted). Further assume that feature i takes m values $v_1, \ldots v_j$ and let $S_{ij}$ be the set of records having $X_i=v_j$. The information gain for feature i in dataset X is computed as:

$$IG(X, X_i) = H(X) - \sum_{j=1}^{m} \frac{|S_{ij}|}{|X|} H(S_{ij}).$$

Here the entropy values H(X) and $H(S_{ij})$ are computed from two bins according to the two classes. This method gives a global ranking of features, but may be further refined to provide higher weights to those features having relative stability within the set of whitelisted modules in a given cluster. In particular, the average values of feature distance for all pairs of whitelisted modules (denoted $Avg_i$) per cluster may be computed, and the value $1/Avg_i$ may be set as a dynamic weight. The dynamic weight, in some embodiments, has an upper bound such as a fixed value set at 20. The final weights may be defined as the product of the static and dynamic weights, normalized to sum up to 1.

Missing features are also addressed in some embodiments. As discussed above, a large fraction of certain features, such as behavior features, may not be available due to different factors such as machines being offline for extended periods of time, machines being rebooted before sending behavior events to a centralized server or database, etc. When computing the distance between two missing values, rather than setting it at 0 some embodiments choose a fixed penalty value instead. The penalty value is a parameter which may be adjusted as desired. The distance between a missing value and any other existing value may be set at the maximum value of 1. Higher penalties result in lower similarity when computing distance metrics, and thus the value of the penalty should be carefully calibrated. In the sample dataset, a penalty value of 0.16 yielded optimal performance. In other embodiments, however, other penalty values may be used.

Clusters of software modules may be created based on one or more attributes of the software modules. As one example, filename may be used to cluster software modules. Filename is an attribute that may be useful in detecting potentially malicious software modules impersonating popular filenames or filenames of whitelisted software modules. Various other attributes may be used to cluster software modules, including combinations of filenames and other attributes. For example, certain static features such as description, company name, etc. may be used, either individually or in combination with filename or other attributes, to cluster software modules.

In some embodiments, clusters are selected such that they have certain desired properties. For example, when using filenames as the clustering attribute, the following properties may be used. First, clusters may be created for filenames that are present on a large number of machines or client devices 104, e.g., on more than a threshold parameter $O_\gamma$ number of machines. Each cluster should have sufficient benign samples, which is ensured by the following conditions: (1) each cluster should include a minimum $O_\alpha$ number of whitelisted software modules; and (2) the ratio of whitelisted modules to all software modules in the cluster is at least a threshold $O_\beta$. In order to detect outliers, the cluster should also include or be compared against one or more unknown or blacklisted software modules.

Ideally, coarse clusters should exhibit similar characteristics. Clusters generated using generic filenames (e.g., setup.exe or update.exe) or other attributes could include files developed by different companies that are very diverse. To account for these cases, some embodiments may compute the average distance of all pairs of whitelisted modules in a cluster (denoted $Avg_{wdist}$). Cluster with $Avg_{wdist}$ larger than a threshold $O_\theta$ may be removed or discarded.

Figure 9:
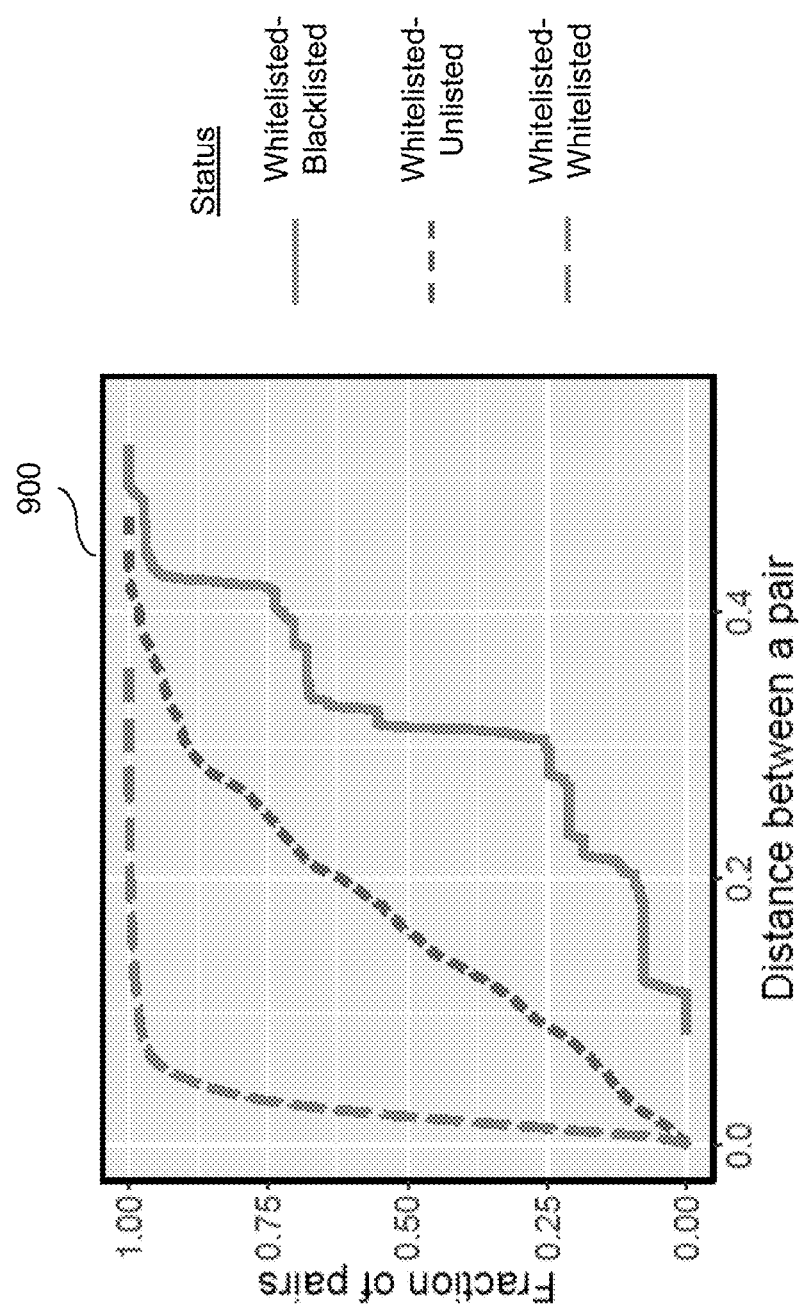
FIG. 9 is a plot showing pairwise distances between software modules in coarse clusters in an illustrative embodiment.

FIG. 9 shows a plot 900 of the pairwise distances between software modules in coarse clusters. Plot 900 shows the CDFs for pairwise distances between whitelisted software modules, between whitelisted and blacklisted software modules, and between whitelisted and unknown software modules in the coarse clusters generated from the sample dataset. As indicated in the plot 900, blacklisted software modules impersonating legitimate filenames are at a larger distance from other whitelisted software modules compared to the typical distance between legitimate software modules. Based on this characteristic, some embodiments seek to identify unknown software modules substantially different from whitelisted software modules in the coarse clusters.

In some embodiments, outliers are detected by measuring neighborhood distance in a coarse cluster. The neighborhood distance indicates the maximum distance from a whitelisted software module to the closest whitelisted neighbor. For each whitelisted software module in a given coarse cluster, the minimum distance to other whitelisted software modules is determined, and the neighborhood distance (denoted $Dist_{WL}$) is the maximum of all the minimum distances. In other embodiments, other measures are used to set the neighborhood distance value, such as the average, mode, median, etc. of the minimum distances. For an unknown module U, the distance to the closest whitelisted module is $Dist_U$. Module U is considered an outlier if the ratio $$R = \frac{Dist_U}{Dist_{WL}} > O_\lambda.$$

Figure 10:
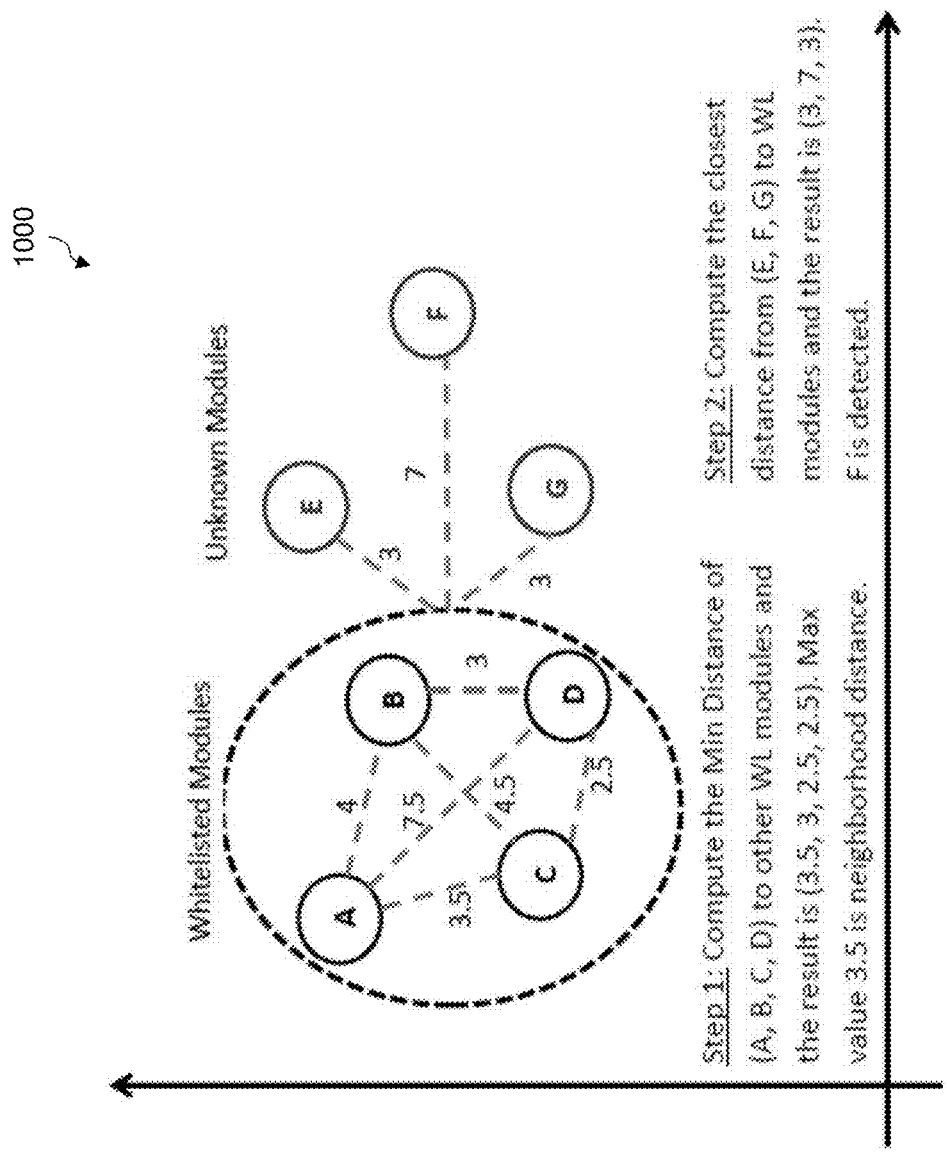
FIG. 10 is a plot showing an example of outlier detection in an illustrative embodiment.

FIG. 10 shows a plot 1000 illustrating an example of setting the minimum distance and identifying outliers in a given coarse cluster. Different values of $O_\lambda$ may be used to try to avoid detection of whitelisted software modules as outliers. Example values for $O_\lambda$ are described below in the context of the sample dataset. The particular value selected for $O_\lambda$, however, may depend on the needs of a particular application. For example, in a particularly cautious approach a smaller $O_\lambda$ threshold may be used resulting in over-detection of outliers.

Described below are certain results obtained using the sample dataset, which as described above included information about 534 blacklisted software modules, approximately 117,000 whitelisted software modules and approximately 1.7 million unknown software modules installed on 40,000 Windows® machines. The outlier detection algorithms described herein were run on two datasets obtained from the sample dataset. The first dataset includes all filename clusters that included at least one whitelisted software module and at least one blacklisted software module. The first dataset, referred to herein as DS-Outlier-Black was tested to determine the effectiveness of identifying the blacklisted software modules in the clusters. DS-Outlier-Black contains 15 clusters and a total of 2,000 whitelisted software modules, 19 blacklisted software modules and 2,000 unknown software modules. The second dataset includes all popular filename clusters, where popular filenames were considered to be those installed on at least 10,000 machines. It is to be appreciated, however, that the popularity of a filename may be defined using various other thresholds in other embodiments. This dataset, also referred to herein as DS-Outlier-Unknown, includes popular filename clusters that had at least one whitelisted software module and at least one unknown software module. DS-Outlier-Unknown contains 314 clusters and a total of 11,000 whitelisted software modules, 14 blacklisted software modules and 5,000 unknown software modules. Unknown modules at a large minimum distance from other whitelisted modules in these clusters were detected as outliers. To validate the detection results, external intelligence, internal antivirus scan results, and manual investigation by security experts were used. VirusTotal, a public and free online file/URL scanning service, was used for external intelligence.

The feature set used to test the DS-Outlier-Black and DS-Outlier-Unknown datasets includes features with different types, such as string, set, binary and numerical attributes. When defining the distance metric between software modules in our scenario, different weights for each feature are assigned based on that feature's information gain in the dataset and its stability within a coarse cluster. FIG. 11 shows a table 1100 ranking different features by the weights assigned. The table 1100 particularly shows the ranks and weights of features according to their information gain, which is persistent across clusters.

As shown in table 1100, a subset of static features (Imported DLLs, PE timestamp, Days since creation, PE size, Section names, Company names) and contextual features (path level, the number of executable and non-executable files in the same folder, Auto_Logon) are highly ranked and obtain high weights in both application scenarios, and thus are potentially very useful in identifying potentially malicious software modules in the datasets. In particular, features related to file signature are ranked top since most blacklisted modules are not signed in the datasets. Behavior features for whitelisted software modules appear to be diverse (e.g., svchost.exe can load any DLL residing in any folder) and many blacklisted software modules have missing behavioral features. For this reason, behavioral features are not ranked high in detecting software impersonation in the sample dataset. This may change, however, based on the underlying dataset as well as the type of outlier being detected. For example, embodiments are not limited solely to detecting outliers that are potentially malicious as described above.

Three metrics are used to evaluate the performance of the outlier detection algorithms in the DS-Outlier-Black and DS-Outlier-Unknown datasets. True positives (TP) measure the number of software modules correctly labeled according to the ground truth, and false positives (FP) and false negatives (FN) measure the number of software modules incorrectly labeled as potentially malicious and benign, respectively, according to the ground truth. Precision and recall are used to assess how accurate detection results are. Precision is set equal to TP/(TP+FP) and recall is set equal to TP/(TP+FN).

In the coarse cluster generation stage or step, popular filenames are selected by comparing the number of software module installations to $O_\gamma$. $O_\gamma$ is set to 10,000, representing 25% of the monitored machines. The value of $O_\gamma$ and other thresholds described herein may be varied according to the needs of a particular application. The setting of $O_\gamma$ to 10,000 captures popular software, such as system processes, web browsers, different Java versions, etc. To ensure that the coarse clusters include enough benign samples for learning legitimate behavior, $O_\alpha$ and $O_\beta$ are used as lower bounds for the number and ratio of whitelisted software modules in a coarse cluster. For the dataset DS-Outlier-Black, $O_\alpha$ is set to 5 and $O_\beta$ is set to 0.2 for larger coverage. For the dataset DS-Outlier-Unknown, $O_\alpha$ is set to 10 and $O_\beta$ is set to 0.1. As illustrated in plot 900 in FIG. 9, the pairwise distance between whitelisted software modules is usually small (below 0.05 for ≥95% pairs), while distances from whitelisted to unknown and blacklisted software modules are much larger. Hence, only stable coarse clusters were included when evaluating the sample dataset, with the stable coarse clusters being those whose $\text{Avg}_{wdist}$ is smaller than the threshold $O_\theta$ set to 0.05.

The 15 filename clusters in DS-Outlier-Black were examined. The 19 blacklisted and 2,000 unknown software modules were inspected, and found most filenames that were targeted by the blacklisted software modules were Windows® system files such as svchost.exe, lsass.exe, dwm.exe, services.exe and explorer.exe. Often, malware impersonates these and other system files to avoid causing suspicion from users as these processes are almost always present in the Task Manager of a normal system. Other filenames belonging to popular software, such as wmplayer.exe for Windows® Media Player, reader_sl.exe for Adobe® Acrobat SpeedLauncher and GoogleUpdate.exe for Google® Installer, are other popular targets for impersonation.

Figure 12:
FIG. 12 is a table summarizing software modules detected as outliers in an illustrative embodiment.
Figure 14:
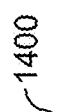
FIG. 14 is a table showing the impact of a threshold on detection of outliers in an illustrative embodiment.

After coarse cluster selection, 5 clusters were obtained that met the selection criteria. These clusters included 12 blacklisted and 12 unknown software modules. The outlier detection algorithm successfully identified all 12 blacklisted software modules as potentially malicious. The distance between the blacklisted software modules and the whitelisted software modules was above 4, much larger than the threshold $O_\lambda$ set at 1. Among the 12 unknown software modules, 8 of the unknown software modules spanning 4 clusters were detected as outliers, and all were confirmed to be either malicious (e.g., flagged by VirusTotal) or potentially malicious or suspicious (based on manual investigation). In particular, one malicious module impersonating services.exe was detected one week ahead of VirusTotal, but other instances of this file are also suspicious (e.g., one of them is part of the ZeroAccess rootkit). FIG. 12 shows a table 1200 summarizing these results, and FIG. 13 shows a table 1300 with detailed results.

The data from DS-Outlier-Unknown is used to evaluate the outlier detection algorithm on a larger set of clusters including at least one unknown software module but not necessarily any blacklisted software modules. DS-Outlier-Unknown includes 314 clusters with 5,000 unknown software modules. After filtering using the above-described thresholds, 14 coarse clusters with 30 unknown and no blacklisted software modules were run through the outlier detection algorithm. New system processes (e.g., mpcmdrun.exe) and new applications (e.g., installflashplayer.exe) were identified in this dataset and compared to DS-Outlier-Black. Among the 30 unknown software modules, 24 were flagged as outliers based on their distance to the closest whitelisted software module. In the set of 24 outliers, 5 were confirmed malicious by VirtusTotal and 12 were considered suspicious by manual investigation. Not enough information was available to validate the remaining 7 software modules, and thus they are labeled as unknown. By considering the malicious and suspicious instances as true positives, the overall precision is 70.8%. Again, these findings are summarized in table 1200 in FIG. 12 and detailed in table 1300 of FIG. 13.

Table 1200 in FIG. 12 has columns identifying the dataset (Dataset), the number of filename clusters (#Filename) in the filtered dataset, the number of blacklisted software modules in the filtered dataset (#Blacklisted), the number of software modules identified as outliers (#Modules), the number of outliers determined to be malicious (#Malicious), the number of outliers determined to be suspicious or potentially malicious (#Suspicious) and the number of outliers that remain unknown or unclassified (#Unknown) and the precision (Precision %).

Table 1300 in FIG. 13 has columns identifying the dataset (Dataset), the filename cluster (Filename), the number of blacklisted modules in the filename cluster (#BL), the number of outliers classified as malicious (#Mal), the number of outliers classified as suspicious or potentially malicious (#Susp), the number of outliers that remain unknown or unclassified (#UK), and the anomalous features for the outliers (Anomalous features).

The impact of the threshold $O_\lambda$ on the results is also assessed. $O_\lambda$ was increased incrementally from 1 to 10, and the number of confirmed (malicious and suspicious) and unknown modules for both the DS-Outlier-Black and DS-Outlier-Unknown datasets was measured. The results are shown in table 1400 in FIG. 14. The results suggest that setting $O_\lambda$ to 1 achieves both high accuracy and good coverage, but other threshold values may be used as desired.

Without relying on specific malware signatures, the outlier detection techniques described herein can accurately detect malicious and potentially malicious software modules that impersonate legitimate software. In the DS-Outlier-Black dataset, for example, the outlier detection technique detected all 12 blacklisted software modules and further detected 8 unknown software modules confirmed malicious through manual investigation. When evaluating with the dataset DS-Outlier-Unknown, which contains more unknown software modules than the DS-Outlier-Black dataset, 24 outlier software modules were identified, among which were 17 true positives. In total, 44 software modules were detected as outliers with an overall precision of 84.09%.

As particular examples, the outlier detection techniques identified 2 blacklisted and 3 unknown software modules with the filename services.exe as outliers. Of the three unknown software modules, one was infected by ZeroAccess, a Trojan horse that steals personal information, replaces search results, downloads and executes additional files. For the remaining two, manual analysis was performed.

One of the modules has a description in Korean without a company name and signature. It has additional section names .itext, .bss, .edata and .tls compared to the legitimate process. The module imports some common DLLs such as kernel32.dll, user32.dll and oleaut32.dll, but also imports shell32.dll and wsock32.dll which is unusual for benign variants of services.exe modules. In addition, the module size is ~1 megabyte (MB) whereas other whitelisted versions of the software module are between 110 kilobytes (KB) and 417 KB. Unfortunately, no behavior features were captured for this module, but it has several suspicious contextual features. The module is installed in only a single machine with hidden attributes and it is located in the directory C:\Windows\winservice, instead of the more usual C:\Windows\System32.

The second detected services.exe module is missing the signature field and imports a different set of DLLs. Even though the module is 32 bit, the DLLs it imports are usually included in 64-bit versions of benign services.exe. It also has some suspicious contextual features since it is installed only in a single machine relatively recently and its file system path is ~\Download\ffadecffabaffc instead of the usual C:\Windows\System32. Both of the unknown services.exe modules were confirmed as malicious by security experts.

As mentioned above, while various embodiments are described in the context of a sample dataset extracted from Windows® machines, similar approaches (possibly with different feature sets) can be implemented on other platforms, such as Mac OS, Linux or Android.

Also as discussed above, while various embodiments are described in the context of detecting malware and other potentially malicious software modules using the exact same filename as legitimate software, embodiments are not so limited. Small changes to filenames may be used in an attempt to avoid detection, such as malware tweaking a filename from services.exe to service.exe. Filenames may be grouped as those similar in edit distance to account for these and other variations when building clusters.

Malware and other potentially malicious software may seek to mimic various types of attributes of legitimate software in addition to or in place of mimicking filenames. For example, an adversary may use file description impersonation, where the description field of the PE header is filled with fake information (e.g., Microsoft® Word). Embodiments can cover these cases by appropriately adjusting the clustering criteria, such as by using file description instead of or in addition to filenames as clustering attributes.

Host-based anomaly detection may be used to detect unusual program behavior. For example, system calls, return addresses from call stack, system state changes, and access activities on files and registries may be used to detect suspicious behavior. Models of file system and registry access may be built and trained using malware and legitimate samples to aid in detecting suspicious behavior. In some cases, this fine-grained information is unavailable using host agents constrained as described herein in a large-scale real-world enterprise monitoring environment. Some unique challenges in such large-scale real-world environments include noisy datasets or missing attributes, the heterogeneous nature of the environment as users install custom applications on their machines, the limited number of labels and the availability of coarse-grained events, etc. These challenges are addressed by adapting outlier-detection machine-learning algorithms to be resilient to missing features, experimenting with a large range of features (that capture the static, behavioral and contextual aspects of files installed on user machines) and choosing feature weights dynamically based on data distribution.

By applying statistical learning techniques on control-flow graphs generated from system events, detection systems may be developed against camouflaged attacks, such as those that inject malicious code in a legitimate application at runtime. Embodiments can capture camouflage attacks as part of software impersonation, but also addresses a larger set of attacks. In some embodiments, network and host-based behavioral features are used for anomaly detection.

It should again be emphasized that the above-described embodiments of the invention are presented for purposes of illustration only. Many variations may be made in the particular arrangements shown. For example, although described in the context of particular network and device configurations, the techniques are applicable to a wide variety of other types of computer networks and processing device configurations. Also, different types and arrangements of network security systems, modules, notifications, alerts and other features can be used in other embodiments. Moreover, the assumptions made herein in the context of describing some illustrative embodiments should not be construed as limitations or requirements of the invention, and need not apply in other embodiments. Numerous other alternative embodiments within the scope of the appended claims will be readily apparent to those skilled in the art.

What is claimed is:

1. A method comprising:
   obtaining at least a first software module not classified as benign or potentially malicious;
   extracting a set of features associated with the first software module, the set of features comprising one or more static features, one or more behavior features and one or more context features;
   identifying a first cluster, the first cluster comprising one or more known software modules previously classified as benign;
   computing distance metrics between the extracted feature set of the first software module and feature sets of respective ones of the known software modules in the first cluster;
   classifying the first software module as one of benign and potentially malicious based on a comparison between the computed distance metrics and a neighborhood distance metric, the neighborhood distance metric being based on distances between feature sets of the known software modules in the first cluster; and
   modifying access by a given client device to the first software module responsive to classifying the first software module as potentially malicious;
   wherein computing the distance metrics comprises assigning penalty values for one or more features missing in the extracted feature set of the first software module;
   wherein the method is performed by at least one processing device comprising a processor coupled to a memory.

2. The method of claim 1 wherein the processing device comprises a network security system configured to communicate with a plurality of client devices, including the given client device, over at least one network.

3. The method of claim 1 wherein the first software module comprises one of: an executable module; and a dynamic link library module.

4. The method of claim 1 wherein the one or more static features comprise one or more descriptive features, one or more numerical features and one or more binary features.

5. The method of claim 1 wherein the one or more behavior features comprise one or more file system access features, one or more process access features and one or more network connection features.

6. The method of claim 1 wherein the one or more context features comprise one or more file system path features, one or more path of destination events features, one or more file metadata features and one or more auto-start functionality features.

7. The method of claim 1 wherein extracting the set of features associated with the first software module comprises:
   extracting the static features from the first software module; and
   extracting the behavior and context features from one or more client devices storing the first software module.

8. The method of claim 1 wherein computing the distance metrics comprises assigning weights to respective ones of the features in the extracted feature set.

9. The method of claim 8 wherein the weight assigned to a given feature in the extracted feature set is proportional to an information gain of the given feature in a plurality of software modules including the first software module and the known software modules in the first cluster.

10. The method of claim 8 wherein the weight assigned to a given feature in the extracted feature set is based on:
    a dynamic feature weight based on distances between the value of the given feature for pairs of known software modules in the first cluster; and
    a static feature weight set proportional to an information gain of the given feature in a plurality of software modules including the first software module and the known software modules in the first cluster.

11. The method of claim 1 wherein identifying the first cluster comprises matching at least one of:
    a filename of the first software module to one or more filenames of the known software modules in the first cluster; and
    a file description of the first software module to one or more file descriptions of the known software modules in the first cluster.

12. The method of claim 1 wherein:
    a number of known software modules in the first cluster exceeds a first threshold;
    a ratio between the number of known software modules to all software modules in the first cluster exceeds a second threshold; and
    the average distances between feature sets of known software modules in the first cluster is less than a third threshold.

13. The method of claim 1 wherein classifying the first software module comprises:
    computing, for each known software module in the first cluster, a minimum distance between that known software module and other known software modules in the first cluster; and
    setting the neighborhood distance metric to a maximum of the minimum distances between known software modules in the first cluster.

14. The method of claim 1 wherein classifying the first software module comprises:
    identifying a minimum one of the computed distance metrics between the extracted feature set of the first software module and feature sets of respective ones of the known software modules in the first cluster;
    classifying the first software module as benign if a ratio of the identified minimum computed distance metric to the neighborhood distance metric is less than a first threshold; and
    otherwise classifying the first software module as potentially malicious.

15. The method of claim 1 wherein modifying access by the given client device to the first software module comprises at least one of:
    removing the first software module from a memory or storage of the given client device;
    preventing the given client device from obtaining the first software module; and
    causing the first software module to be opened in a sandboxed application environment on the given client device.

16. A computer program product comprising a non-transitory processor-readable storage medium having stored therein program code of one or more software programs, wherein the program code when executed by at least one processing device cause the at least one processing device:

to obtain at least a first software module not classified as benign or potentially malicious;

to extract a set of features associated with the first software module, the set of features comprising one or more static features, one or more behavior features and one or more context features;

to identify a first cluster, the first cluster comprising one or more known software modules previously classified as benign;

to compute distance metrics between the extracted feature set of the first software module and feature sets of respective ones of the known software modules in the first cluster;

to classify the first software module as one of benign and potentially malicious based on a comparison between the computed distance metrics and a neighborhood distance metric, the neighborhood distance metric being based on distances between feature sets of the known software modules in the first cluster; and to modify access by a given client device to the first software module responsive to classifying the first software module as potentially malicious;

wherein computing the distance metrics comprises assigning penalty values for one or more features missing in the extracted feature set of the first software module.

17. The computer program product of claim 16 wherein the program code when executed causes the processing device to classify the first software module by:

computing, for each known software module in the first cluster, a minimum distance between that known software module and other known software modules in the first cluster;

setting the neighborhood distance metric to a maximum of the minimum distances between known software modules in the first cluster;

identifying a minimum one of the computed distance metrics between the extracted feature set of the first software module and feature sets of respective ones of the known software modules in the first cluster;

classifying the first software module as benign if a ratio of the identified minimum computed distance metric to the neighborhood distance metric is less than a first threshold; and otherwise classifying the first software module as potentially malicious.

18. An apparatus comprising:

at least one processing device comprising a processor coupled to a memory;

the at least one processing device being configured:

to obtain at least a first software module not classified as benign or potentially malicious;

to extract a set of features associated with the first software module, the set of features comprising one or more static features, one or more behavior features and one or more context features;

to identify a first cluster, the first cluster comprising one or more known software modules previously classified as benign;

to compute distance metrics between the extracted feature set of the first software module and feature sets of respective ones of the known software modules in the first cluster;

to classify the first software module as one of benign and potentially malicious based on a comparison between the computed distance metrics and a neighborhood distance metric, the neighborhood distance metric being based on distances between feature sets of the known software modules in the first cluster; and to modify access by a given client device to the first software module responsive to classifying the first software module as potentially malicious;

wherein computing the distance metrics comprises assigning penalty values for one or more features missing in the extracted feature set of the first software module.

19. The apparatus of claim 18 wherein the at least one processing device is further configured to classify the first software module by:

computing, for each known software module in the first cluster, a minimum distance between that known software module and other known software modules in the first cluster;

setting the neighborhood distance metric to a maximum of the minimum distances between known software modules in the first cluster;

identifying a minimum one of the computed distance metrics between the extracted feature set of the first software module and feature sets of respective ones of the known software modules in the first cluster;

classifying the first software module as benign if a ratio of the identified minimum computed distance metric to the neighborhood distance metric is less than a first threshold; and otherwise classifying the first software module as potentially malicious.

* * * * *